US011872465B2

(12) United States Patent
Koblin et al.

(10) Patent No.: US 11,872,465 B2
(45) Date of Patent: Jan. 16, 2024

(54) VIRTUAL AND AUGMENTED REALITY PERSONALIZED AND CUSTOMIZED FITNESS TRAINING ACTIVITY OR GAME, METHODS, DEVICES, AND SYSTEMS

(71) Applicant: WITHIN UNLIMITED, INC., Los Angeles, CA (US)

(72) Inventors: Aaron Koblin, Venice, CA (US); Chris Milk, Los Angeles, CA (US)

(73) Assignee: Within Unlimited, Inc., Venice, CA (US)

( * ) Notice: Subject to any disclaimer, the term of this patent is extended or adjusted under 35 U.S.C. 154(b) by 447 days.

(21) Appl. No.: 17/236,543

(22) Filed: Apr. 21, 2021

(65) Prior Publication Data

US 2021/0362029 A1 Nov. 25, 2021

Related U.S. Application Data

(60) Provisional application No. 63/014,046, filed on Apr. 22, 2020.

(51) Int. Cl.
A63B 71/06 (2006.01)
G06T 19/00 (2011.01)
(Continued)

(52) U.S. Cl.
CPC ...... *A63B 71/0622* (2013.01); *A63B 24/0062* (2013.01); *A63B 24/0075* (2013.01);
(Continued)

(58) Field of Classification Search
CPC .......... G06T 19/006; A63B 2071/0641; A63B 24/0075; A63B 2024/0068;
(Continued)

(56) References Cited

U.S. PATENT DOCUMENTS

2018/0059777 A1 3/2018 Kobayashi et al.
2018/0207484 A1 7/2018 Briggs et al.
(Continued)

FOREIGN PATENT DOCUMENTS

WO 2020070630 A1 4/2020

OTHER PUBLICATIONS

Supernatural video, Oculus Quest, Meta Quest, Apr. 10, 2020, YouTube, 7 screenshots at 0:00,0:03,0:10,0:11,0:18,0:22,and1:01, https://www.youtube.com/watch?v=Rd8NJZVRISM, screenshots made on Sep. 7, 2023. (Year: 2020).*
(Continued)

*Primary Examiner* — Jeffery A Brier
(74) *Attorney, Agent, or Firm* — McDermott Will & Emery LLP

(57) ABSTRACT

A method includes determining a customized action routine for a person to carry out in a virtual world, where the person is wearing a virtual reality (VR) headset. Objects associated with events from the routine are presented to the person in a virtual world via the VR headset; and aspects of the person's virtual interaction with the object in the virtual world are rendered on the VR headset. The person's virtual interactions with virtual objects is analyzed and used to determine, in real time, one or more next events for said routine.

6 Claims, 39 Drawing Sheets

(51) Int. Cl.
A63B 24/00 (2006.01)
G02B 27/00 (2006.01)
G06F 3/01 (2006.01)

(52) U.S. Cl.
CPC ......... *G02B 27/0093* (2013.01); *G06F 3/012* (2013.01); *G06F 3/014* (2013.01); *G06T 19/006* (2013.01); *A63B 2024/0068* (2013.01); *A63B 2071/0641* (2013.01); *A63B 2071/0666* (2013.01); *A63B 2225/02* (2013.01)

(58) Field of Classification Search
CPC ........ A63B 2071/0666; A63B 2225/02; A63B 71/0622; A63B 24/0062; G06F 3/012; G06F 3/014; G02B 27/0093; G02B 2027/0141; G02B 2027/0181; G02B 27/017
See application file for complete search history.

(56) References Cited

U.S. PATENT DOCUMENTS

2019/0160339 A1 5/2019 Zhang et al.
2020/0054931 A1 2/2020 Martin et al.

OTHER PUBLICATIONS

WIPO, International Search Report received in International Application No. PCT/IB2019/053307, dated Aug. 17, 2021, (4p.).
WIPO, International Written Opinion received in International Application No. PCT/IB2019/053307, dated Aug. 17, 2021, (7p.).

* cited by examiner

106 FITNESS / TRAINING SYSTEM

- 202 PROCESSOR(S)
- 206 COMMUNICATIONS

204 MEMORY

210 FITNESS / TRAINING PROGRAM(S)

- 212 DATA COLLECTION
- 214 MOVEMENT/TRACKING
- 216 MAPPING & TRANSFORMATION
- 218 CALIBRATION
- 220 ROUTINE GENERATION
- 222 EVALUATION

224 DATA STRUCTURES
- 226 ROUTINE
- 228 USER

FIG. 5A
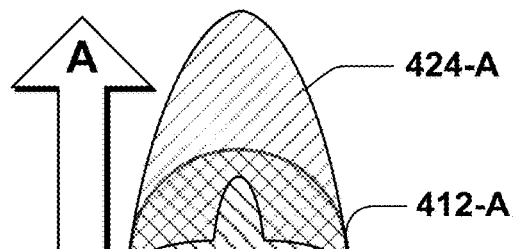
FIG. 5B
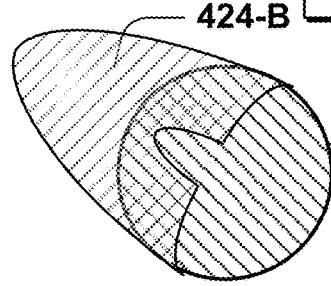
FIG. 5C
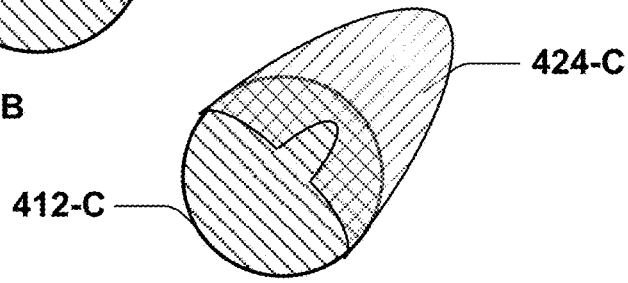
FIG. 5D
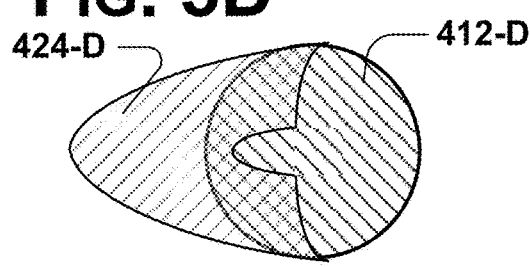
FIG. 5E
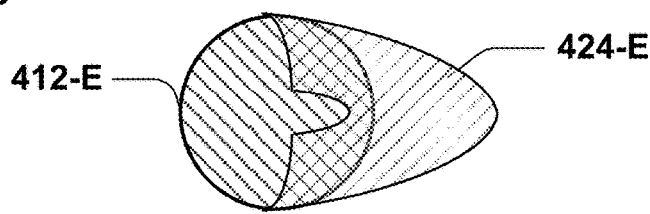
FIG. 5F
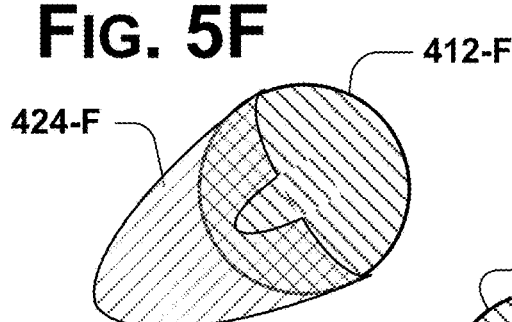
FIG. 5G
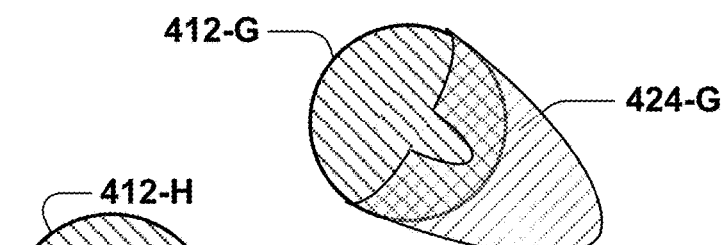
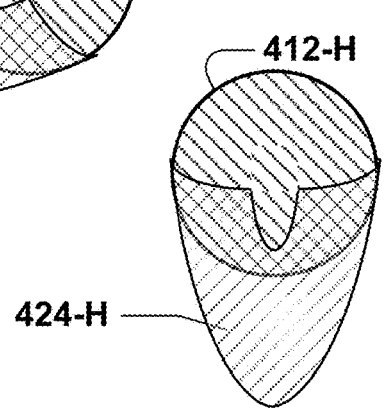
FIG. 5H

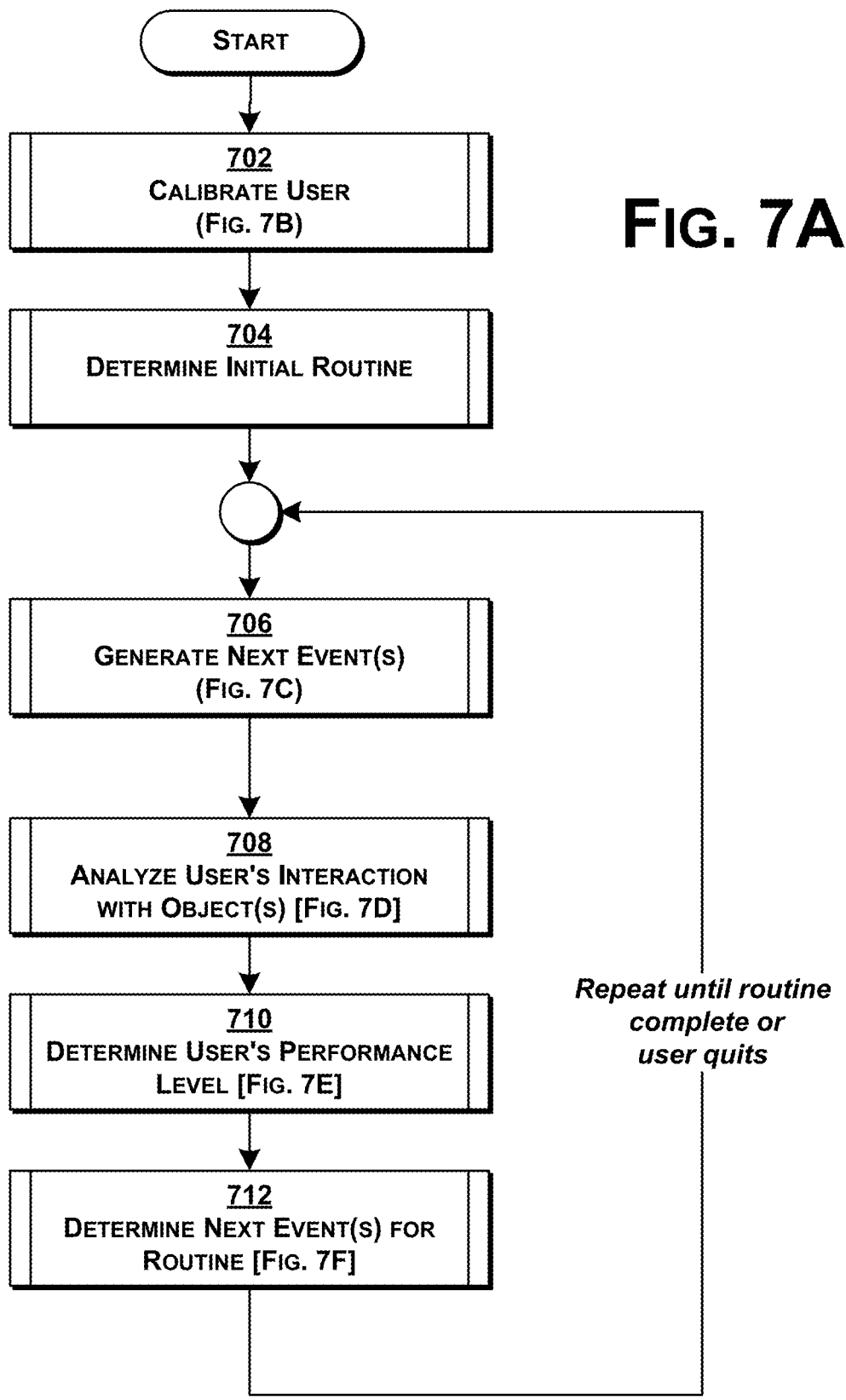

124

124

124

124

FIG. 10A
FIG. 10B

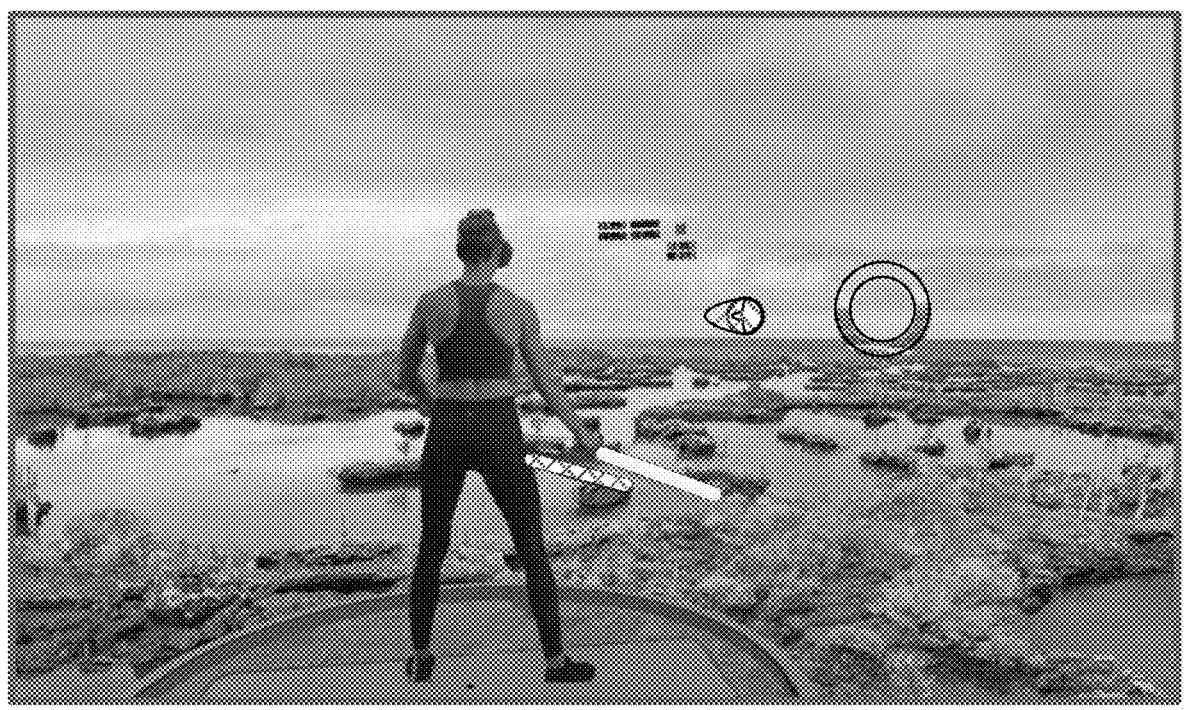
FIG. 10C
FIG. 10D

FIG. 10E
FIG. 10F

FIG. 10G
FIG. 10H

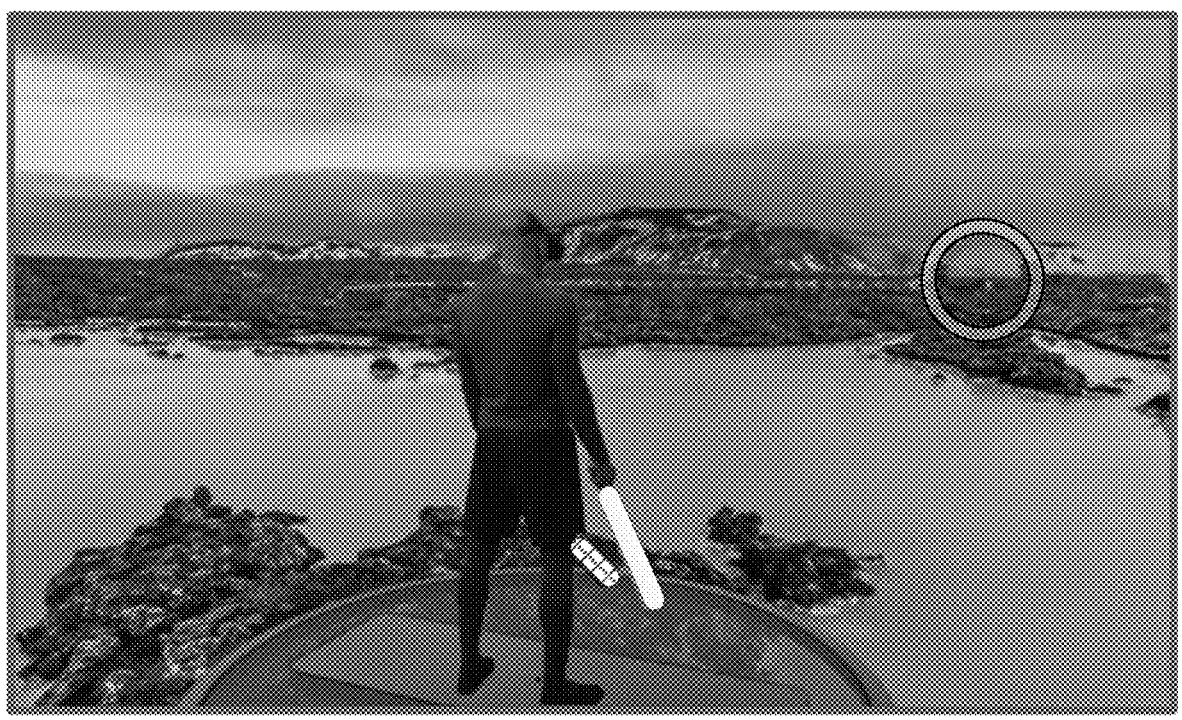
FIG. 11A
FIG. 11B

FIG. 11C
FIG. 11D
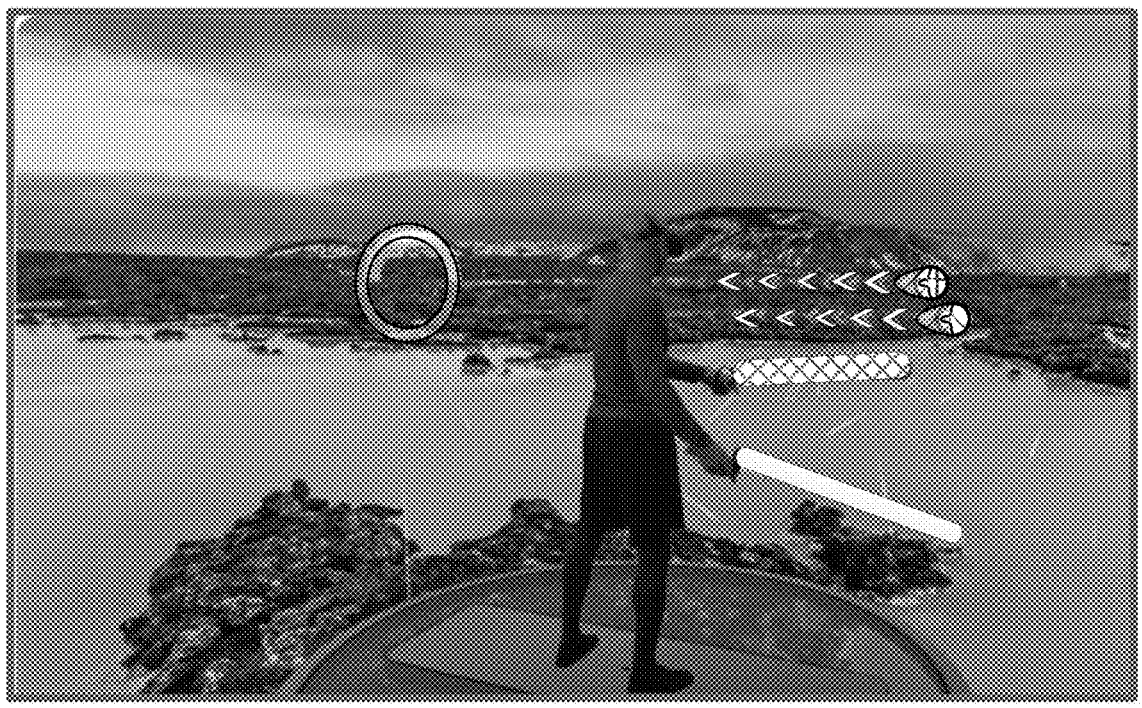

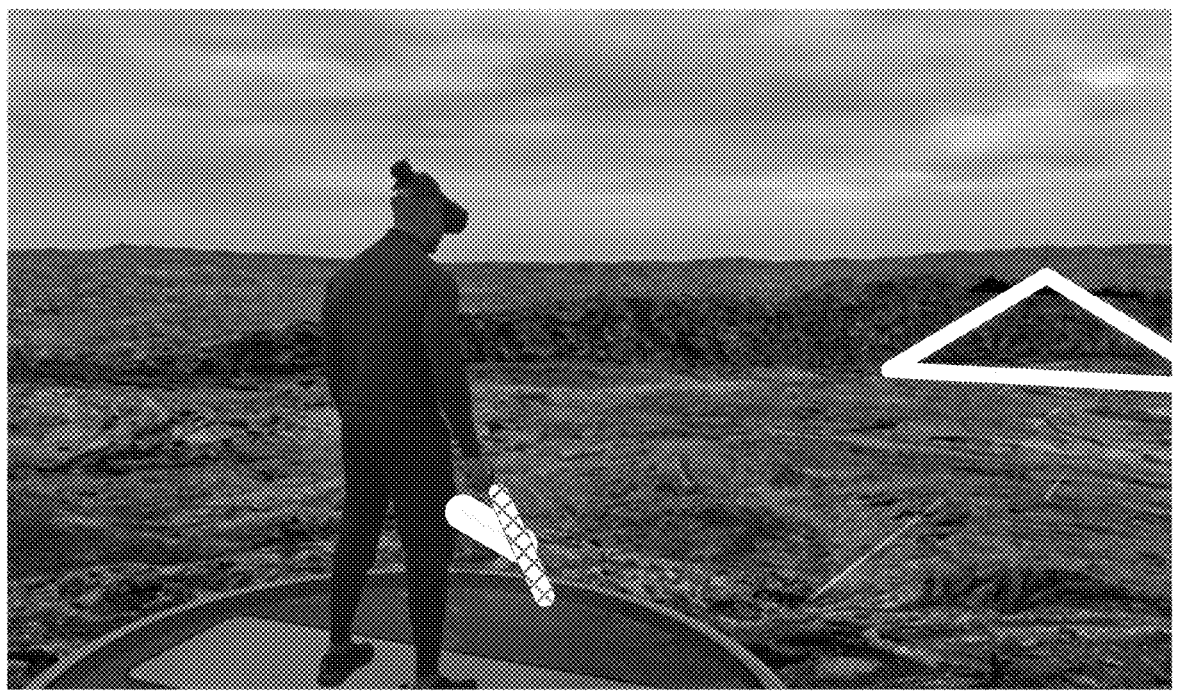
FIG. 12A
FIG. 12B
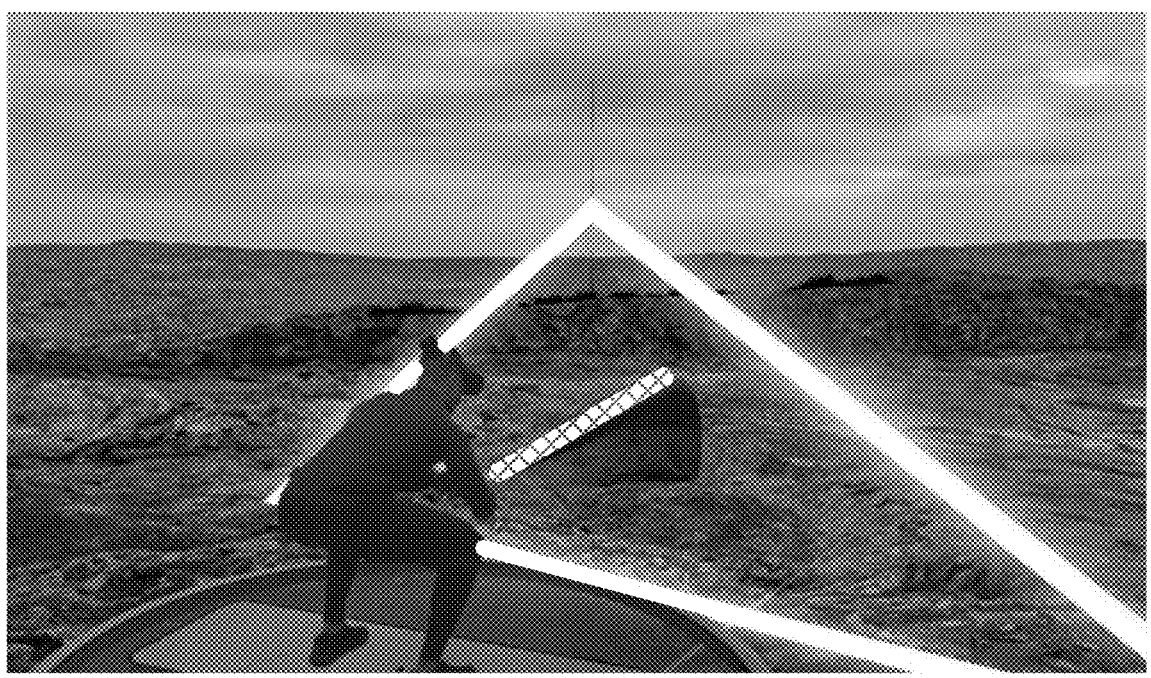

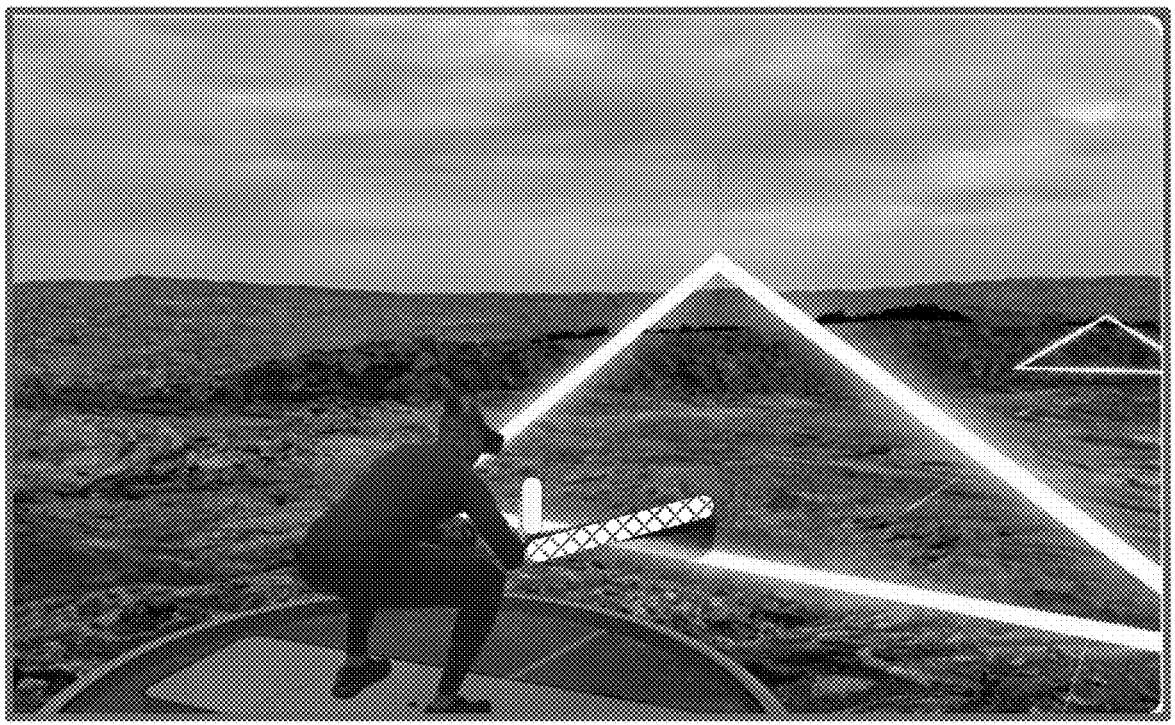
FIG. 13B
FIG. 13C
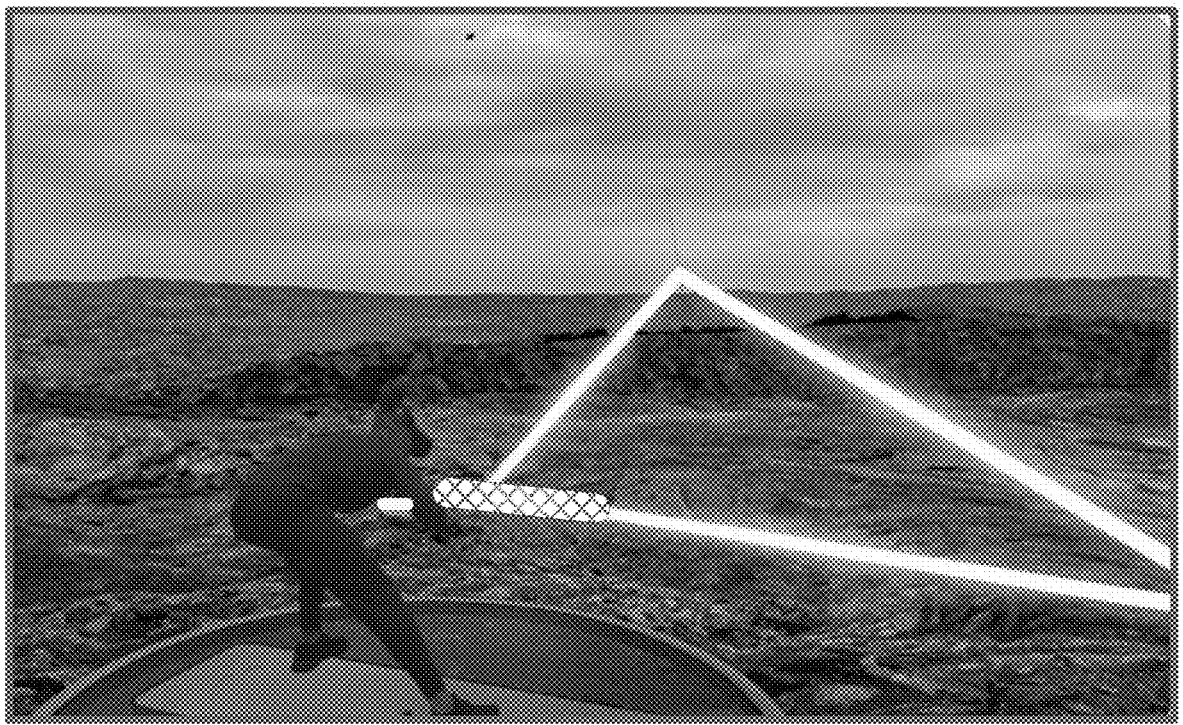

VIRTUAL AND AUGMENTED REALITY PERSONALIZED AND CUSTOMIZED FITNESS TRAINING ACTIVITY OR GAME, METHODS, DEVICES, AND SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application claims the benefit of U.S. Provisional patent application no. 63/014,046, filed Apr. 22, 2020, the entire contents of which are hereby fully incorporated herein by reference for all purposes.

FIELD OF THE INVENTION

This invention relates generally to virtual reality (VR), and, more particularly, to methods, systems and devices supporting exercising and training in a VR environment.

BACKGROUND

Virtual and augmented reality devices allow a user to view and interact with virtual environments. A user may, effectively, immerse themselves in a non-real environment and interact with that environment. For example, a user may interact (e.g., play a game) in a virtual environment, where the user's real-world movements are translated to acts in the virtual world. Thus, e.g., a user may simulate tennis play or fencing or the like in a virtual environment by their real-world movements.

A user may see a view of their virtual environment with a wearable VR/AR device such as a virtual reality (VR) headset or augmented reality (AR) glasses or the like (generally referred to as a head-mounted display (HMD)).

People should get regular exercise, and many people attend group or individual exercise programs at gyms, schools, or the like. At these programs, users are instructed and guided through exercise routines, usually by a person (e.g., a coach) who can monitor, instruct, and encourage participants. A good coach or instructor may customize a routine for a user and may modify the routine based on that user's performance. However, in some situations (e.g., during quarantine for a pandemic), users may not be able or willing to attend such programs.

It is desirable, and an object of this invention, to provide instructed and guided personalized exercise routines.

It is further desirable and a further object of this invention to monitor users using such routines and to modify the routines if and as needed.

SUMMARY

The present invention is specified in the claims as well as in the below description. Preferred embodiments are particularly specified in the dependent claims and the description of various embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method including (a) determining calibration information about a person wearing a user device in a real-world environment, where the user device may include a virtual reality (VR) headset being worn by the person. The method also includes (b) based on said calibration information, determining a routine for the person, where the routine may include a series of events; and then. The method also includes (c) presenting an object associated with an event from the routine to the person in a virtual world via the VR headset. The method also includes (d) rendering aspects of a virtual interaction of the person with the object in the virtual world on the VR headset. The method also includes (e) analyzing the virtual interaction with the object. The method also includes (f), based on said analyzing, in real time, determining one or more next events for said routine. Implementations and/or embodiments may include one or more of the following features, alone or in combination(s):

The method may include repeating acts (c), (d), (e), and (f) until the routine is done or the person stops.

The method where at least one VR handheld controller is worn or held by the person.

The method comprising tracking at least one of the person's hands directly.

The method where the calibration information includes one or more of: height, vertical reach, left lunge information, right lunge information, and squat information.

The method where the routine may include a time-ordered series of events.

The method where the user device may include two VR handheld controllers being worn or held by the person.

The method where analyzing the virtual interaction with the object may include: recognizing and analyzing movements of the person to determine movement data; and mapping the movement data to the virtual world.

The method where the method may include: based on said analyzing, providing feedback to the person.

The method where the method may include determining a performance level of the person.

The method where the performance level is based on the person's virtual interaction with the object relative to an expected or desired interaction with the object.

The method where the one or more next events for said routine are determined based on the performance level of the person.

The method where the performance level is also based on physiological data associated with the person.

The method where an event has a corresponding object associated therewith.

The method where the object may include one of: a hit object; a squat object; or a lunge object.

The method where the hit object may include a hit direction.

The method where the hit object may include a tail.

The method where, when the object may include a hit object, analyzing the virtual interaction with the object may include: determining whether the person virtually hit the object in the hit direction with a virtual baton controlled by the at least one VR handheld controller and whether the person followed through the virtual hit.

The method where, when the object may include a hit object, analyzing the virtual interaction with the object may include: determining whether the person virtually hit the object in the hit direction with a virtual baton controlled by the at least one VR handheld controller.

The method where the squat object may include a symmetric triangle.

The method where the lunge object may include an asymmetric triangle.

The method where, when the object may include a hit object, analyzing the virtual interaction with the object may include: determining whether the person virtually hit the object with a virtual baton controlled by the at least one VR handheld controller.

The method where, when the object may include a squat object, analyzing the virtual interaction with the object may include: determining an amount of squatting by the person while the squat object passed the person in the virtual world.

The method where, when the object may include a lunge object, analyzing the virtual interaction with the object may include: determining an amount and direction of lunging by the person while the lunge object passed the person in the virtual world.

The method where the squat object or the lunge object may include a hold shape, and where analyzing the virtual interaction with the object may include: determining an amount and duration of squatting or lunging by the person while the object passed the person in the virtual world.

The method where the object has a source location associated therewith, and where the object is presented on the VR headset to appear at and come from the source location in the virtual world toward the person.

The method where the object has a speed associated therewith, and where the object is presented on the VR headset to appear at and come toward the person in the virtual world at the speed.

The method where the routine may include a fitness or exercise routine.

Another general aspect includes a computer-implemented method including (a) providing a user device in a real-world environment, where the user device may include a virtual reality (VR) headset being worn by a person, the VR headset being capable of providing images of scenes and objects to the person through the VR headset to generate a visual representation of a virtual world. The method also includes (b) determining a visual routine for the person to view in the virtual world using the VR headset, the visual routine may include a plurality of objects with which the person may interact using a prescribed action. The method also includes (c) presenting a first object of the plurality of objects to the person in the virtual world. The method also includes (d) allowing the person to virtually interact with the first object in the virtual world. The method also includes (e) measuring aspects of a virtual interaction between the person and the presented first object. The method also includes (f) analyzing measured aspects of the virtual interaction. The method also includes (g) based on the analyzing, in real time, presenting a second object of the plurality of objects to the person in the virtual world.

Implementations and/or embodiments may include one or more of the following features, alone and/or in combination(s):

The computer-implemented method may include repeating acts (c)-(g) for multiple objects in the plurality of objects of the visual routine. The plurality of objects may include a series of objects. The prescribed action by the user may include a swinging motion to hit the first object, and where the measured aspects include a direction of the swinging motion with respect to the first object. The prescribed action by the user may include a swinging motion to hit the first object, and where the measured aspects include a speed of the swinging motion with respect to the first object. The prescribed action by the user may include a swinging motion to hit the first object, and where the measured aspects include a length of the swinging motion with respect to the first object. The first object may include a triangular shape, the prescribed action by the user may include a squatting motion, and the measured aspects include a vertical displacement of the squatting motion with respect to an apex of the triangular shape. The first object may include a triangular shape, and where the prescribed action by the user may include a lunging motion, and where the measured aspects include a relative position of the user's head with respect to a location of an apex of the triangular shape. The first object includes a visual marker indicating to the user a direction of a swinging action with respect to the first object. The first object is generated at a first portal within the virtual world, and where the first object includes a visual marker indicating to the user a direction of a swinging action with respect to the first object.

Another general aspect includes a computer-implemented including (a) providing a user device in a real-world environment, where the user device may include a virtual reality (VR) headset being worn by a person, the VR headset being capable of providing images of scenes and objects to the person through the VR headset to generate a visual representation of a virtual world. The method also includes (b) determining a visual routine for the person to view in the virtual world using the VR headset, the visual routine may include a plurality of triangles, each of the triangles having a defined shape and an apex. The method also includes (c) determining, during the visual routine, a position of the VR headset in the virtual world. The method also includes (d) based on the determining in (c), presenting to the person in the virtual world a first triangle of the plurality of triangles. The method also includes (e) allowing the person to virtually interact with the presented first triangle in the virtual world. The method also includes (f) comparing the position of the VR headset with respect to a location of the apex of the first triangle. The method also includes (g) recording results of the comparing in (f).

Implementations and/or embodiments may include one or more of the following features, alone and/or in combinations:

The method where the allowing in (e) may include: allowing the person to virtually interact with the presented first triangle in the virtual world by positioning their body in the real world until the VR headset is positioned below and adjacent to a location of the apex of the presented first triangle.

Another general aspect includes a computer-implemented method that includes (a) providing a user device in a real-world environment, where the user device may include a virtual reality (VR) headset being worn by a person, the VR headset being capable of providing images of scenes and objects to the person through the VR headset to generate a visual representation of a virtual world. The method also includes (b) determining a visual routine for the person to view in the virtual world using the VR headset, the visual routine may include a series of objects, the objects being generated from one of a first portal and a second portal, each of the objects advancing towards the person in the virtual world. The method also includes (c) presenting, to the person in the virtual world, a first object from the first portal. The method also includes (d) providing indication on the first object, a location of the second portal. The method also includes (e) presenting, to the person in the virtual world, a second object from the second portal.

Implementations and/or embodiments may include one or more of the following features, alone and/or in combinations: The computer-implemented method may include repeating acts (c)-(e) for multiple objects of the visual routine. In (d), the indication on the first object may include an arrow shape. In (d), the indication on the first object may include a triangle shape.

Implementations of the described techniques may include hardware, a method or process, or computer software on a computer-accessible medium.

Other embodiments of these aspects described above include corresponding computer systems, apparatus, and computer programs recorded on one or more computer storage devices, each configured to perform the actions of the methods.

A skilled reader will understand that any method described above or below and/or claimed and described as a sequence of steps or acts is not restrictive in the sense of the order of steps or acts.

Below is a list of method or process embodiments. Those will be indicated with a letter "P". Whenever such embodiments are referred to, this will be done by referring to "P" embodiments.

P1. A computer-implemented method comprising:
(A) determining a routine for a person wearing a user device in a real-world environment, wherein the user device comprises a virtual reality (VR) headset being worn by the person;
(B) presenting an object associated with an event from the routine to the person in a virtual world via the VR headset; and
(C) rendering aspects of a virtual interaction of the person with the object in the virtual world on the VR headset;
(D) analyzing the virtual interaction with the object; and
(E) based on the analyzing, in real time, determining one or more next events for the routine.

P2. The method of any of the previous embodiment(s), further comprising repeating acts (B), (C), (D), and (E) until the routine is done or the person stops.

P3. The method of any of the previous embodiment(s), further comprising:
(X) determining calibration information about the person wearing the user device in the real-world environment, and wherein the determining in (A) is based on the calibration information.

P4. The method of embodiment(s) P3, wherein the calibration information includes one or more of: height, vertical reach, left lunge information, right lunge information, and squat information.

P5. The method of any of the previous embodiment(s), wherein the routine comprises a time-ordered series of events.

P6. The method of any of the previous embodiment(s) wherein the user device comprises at least one VR handheld controller being worn or held by the person.

P7. The method of embodiment(s) P6, wherein the at least one VR handheld controller is rendered in the virtual world based on an expected virtual interaction of the person with the object.

P8. The method of any of the previous embodiment(s), wherein analyzing the virtual interaction with the object comprises:
recognizing and analyzing movements of the person to determine movement data; and mapping the movement data to the virtual world.

P9. The method of any of the previous embodiment(s), further comprising, based on the analyzing, providing feedback to the person.

P10. The method of any of the previous embodiment(s), further comprising determining a performance level of the person.

P11. The method of any of the previous embodiment(s), wherein the performance level is used to determine the one or more next events for the routine.

P12. The method of any of the previous embodiment(s), wherein the performance level is based on the person's virtual interaction with the object relative to an expected or desired interaction with the object.

P13. The method of any of the previous embodiment(s), wherein the one or more next events for the routine are determined based on the performance level of the person.

P14. The method of any of the previous embodiment(s), wherein an event has a corresponding object associated therewith.

P15. The method of any of the previous embodiment(s), wherein the object comprises one of: a hit object; a squat object; or a lunge object.

P16. The method of any of the previous embodiment(s), wherein the hit object comprises a hit direction.

P17. The method of any of the previous embodiment(s), wherein the hit object comprises a tail.

P18. The method of any of the previous embodiment(s), wherein the squat object comprises a symmetric triangle.

P19. The method of any of the previous embodiment(s), wherein the lunge object comprises an asymmetric triangle.

P20. The method of any of the previous embodiment(s), wherein the object has a source location associated therewith, and wherein the object is presented on the VR headset to appear at and come from the source location in the virtual world toward the person.

P21. The method of any of the previous embodiment(s), wherein the object has a speed associated therewith, and wherein the object is presented on the VR headset to appear at and come toward the person in the virtual world at the speed.

P22. The method of any of the previous embodiment(s), wherein, when the object comprises a hit object, analyzing the virtual interaction with the object comprises determining whether the object was virtually hit by the person.

P23. The method of any of the previous embodiment(s), wherein analyzing the virtual interaction with the object comprises determining whether the object was virtually hit with a virtual baton controlled by at least one VR handheld controller being worn or held by the person.

P24. The method of any of the previous embodiment(s), wherein, when the object comprises a hit object, analyzing the virtual interaction with the object comprises determining whether the object was virtually hit in the hit direction by the person.

P25. The method of any of the previous embodiment(s), wherein, when the object comprises a hit object, analyzing the virtual interaction with the object comprises determining whether the object was virtually hit in the hit direction with a virtual baton controlled by at least one VR handheld controller being worn or held by the person.

P26. The method of any of the previous embodiment(s), wherein, when the object comprises a hit object, analyzing the virtual interaction with the object comprises determining whether the object was virtually hit in the hit direction with a virtual baton controlled by the at least one VR handheld controller and whether the person followed through the virtual hit.

P27. The method of any of the previous embodiment(s), wherein the performance level is also based on physiological data associated with the person.

P28. The method of any of the previous embodiment(s), wherein, when the object comprises a squat object, analyzing the virtual interaction with the object comprises: determining an amount of squatting by the person while the squat object passed the person in the virtual world.

P29. The method of any of the previous embodiment(s), wherein, when the object comprises a lunge object, analyzing the virtual interaction with the object comprises: determining an amount and direction of lunging by the person while the lunge object passed the person in the virtual world.

P30. The method of any of the previous embodiment(s), wherein the lunge object comprises a triangle, and wherein determining the amount and/or direction of lunging is based a position of the person's head in the virtual world relative to an apex of the triangle.

P31. The method of any of the previous embodiment(s), wherein the squat object or the lunge object comprises a hold shape, and wherein analyzing the virtual interaction with the object comprises: determining an amount and duration of squatting or lunging by the person while the object passed the person in the virtual world.

P32. The method of any of the previous embodiment(s), wherein the object is presented in the virtual world as coming from a first location in the virtual world, and wherein the object includes an indication of a second location in the virtual world for a subsequent object to be presented.

P33. The method of embodiment(s) P32 wherein the indication of the second location comprises an arrow.

P34. The method of any of the previous embodiment(s), wherein the routine comprises a fitness or exercise routine.

P35. A computer-implemented method comprising:
(A) providing a user device in a real-world environment, wherein the user device comprises a virtual reality (VR) headset being worn by a person, the VR headset being capable of providing images of scenes and objects to the person through the VR headset to generate a visual representation of a virtual world;
(B) determining a visual routine for the person to view in the virtual world using the VR headset, the visual routine comprising a plurality of objects with which the person may interact using a prescribed action;
(C) presenting a first object of the plurality of objects to the person in the virtual world;
(D) allowing the person to virtually interact with the first object in the virtual world;
(E) measuring aspects of a virtual interaction between the person and the presented first object;
(F) analyzing measured aspects of the virtual interaction; and
(G) based on the analyzing, in real time, presenting a second object of the plurality of objects to the person in the virtual world.

P36. The computer-implemented method of embodiment P35, further comprising: repeating acts (C)-(G) for multiple objects in the plurality of objects of the visual routine.

P37. The computer-implemented method of any of embodiment(s) P35-P36, wherein the plurality of objects comprises a series of objects.

P38. The computer-implemented method of any of embodiment(s) P35-P37, wherein the prescribed action by the user comprises a swinging motion to hit the first object, and wherein the measured aspects include a direction of the swinging motion with respect to the first object.

P39. The computer-implemented method of any of embodiment(s) P35-P38, wherein the prescribed action by the user comprises a swinging motion to hit the first object, and wherein the measured aspects include a speed of the swinging motion with respect to the first object.

P40. The computer-implemented method of any of embodiment(s) P35-P40, wherein the prescribed action by the user comprises a swinging motion to hit the first object, and wherein the measured aspects include a length of the swinging motion with respect to the first object.

P41. The computer-implemented method of any of embodiment(s) P35-P40, wherein the first object comprises a triangular shape, the prescribed action by the user comprises a squatting motion, and wherein the measured aspects include a vertical displacement of the squatting motion with respect to an apex of the triangular shape.

P42. The computer-implemented method of any of embodiment(s) P35-P41, wherein the first object comprises a triangular shape, and wherein the prescribed action by the user comprises a lunging motion, and wherein the measured aspects include a relative position of the user's head with respect to a location of an apex of the triangular shape.

P43. The computer-implemented method of any of embodiment(s) P35-P42, wherein the first object includes a visual marker indicating to the user a direction of a swinging action with respect to the first object.

P44. The computer-implemented method of any of embodiment(s) P35-P43, wherein the first object is generated at a first portal within the virtual world, and wherein the first object includes a visual marker indicating to the user a direction of a swinging action with respect to the first object.

P45. A computer-implemented method comprising:
(A) providing a user device in a real-world environment, wherein the user device comprises a virtual reality (VR) headset being worn by a person, the VR headset being capable of providing images of scenes and objects to the person through the VR headset to generate a visual representation of a virtual world;
(B) determining a visual routine for the person to view in the virtual world using the VR headset, the visual routine comprising a plurality of triangles, each of the triangles having a defined shape and an apex;
(C) determining, during the visual routine, a position of the VR headset in the virtual world;

(D) based on the determining in (C), presenting to the person in the virtual world a first triangle of the plurality of triangles;

(E) allowing the person to virtually interact with the presented first triangle in the virtual world;

(F) comparing the position of the VR headset with respect to a location of the apex of the first triangle; and (G) recording results of the comparing in (F).

P46. The method of embodiment(s) P45, wherein the allowing in (E) comprises: allowing the person to virtually interact with the presented first triangle in the virtual world by positioning their body in the real world until the VR headset is positioned below and adjacent to a location of the apex of the presented first triangle.

P47. A computer-implemented method comprising:

(A) providing a user device in a real-world environment, wherein the user device comprises a virtual reality (VR) headset being worn by a person, the VR headset being capable of providing images of scenes and objects to the person through the VR headset to generate a visual representation of a virtual world;

(B) determining a visual routine for the person to view in the virtual world using the VR headset, the visual routine comprising a series of objects, the objects being generated from one of a first portal and a second portal, each of the objects advancing towards the person in the virtual world;

(C) presenting, to the person in the virtual world, a first object from the first portal;

(D) providing indication on the first object, a location of the second portal; and (E) presenting, to the person in the virtual world, a second object from the second portal.

P48. The computer-implemented method of embodiment P47 further comprising: repeating acts (C), (D), and (E) for multiple objects of the visual routine.

P49. The computer-implemented method of any of embodiment(s) P47-P48, wherein, in (D), the indication on the first object comprises an arrow shape.

P50. The computer-implemented method of any of embodiment(s) P47-P49, wherein, in (D), the indication on the first object comprises a triangle shape.

Below are device embodiments, indicated with a letter "D".

D51. A device, comprising:

(a) hardware including memory and at least one processor, and (b) a service running on the hardware, wherein the service is configured to perform the method of any of the preceding method embodiments P1-P50.

Below is an article of manufacture embodiment, indicated with a letter "M".

M52. An article of manufacture comprising non-transitory computer-readable media having computer-readable instructions stored thereon, the computer readable instructions including instructions for implementing a computer-implemented method, the method operable on a device comprising hardware including memory and at least one processor and running a service on the hardware, the method comprising the method of any one of the preceding method embodiments P1-P50.

Below is computer-readable recording medium embodiment, indicated with a letter "R".

R53. A non-transitory computer-readable recording medium storing one or more programs, which, when executed, cause one or more processors to, at least: perform the method of any one of the preceding method embodiments P1-P50.

The above features, along with additional details of the invention, are described further in the examples herein, which are intended to further illustrate the invention but are not intended to limit its scope in any way.

BRIEF DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 7A-7F are flowcharts of exemplary aspects hereof;

FIGS. 8A-8D, 9A-9F, 10A-10H, 11A-11D, 12A-12C, 13A-13C, 14A-14C, and 15A-15B are screenshots or images of aspects of an implementation hereof.

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

"AR" means augmented reality.

"VR" means virtual reality.

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

DESCRIPTION

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

It will be appreciated that variations to the foregoing embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

Figure 1:
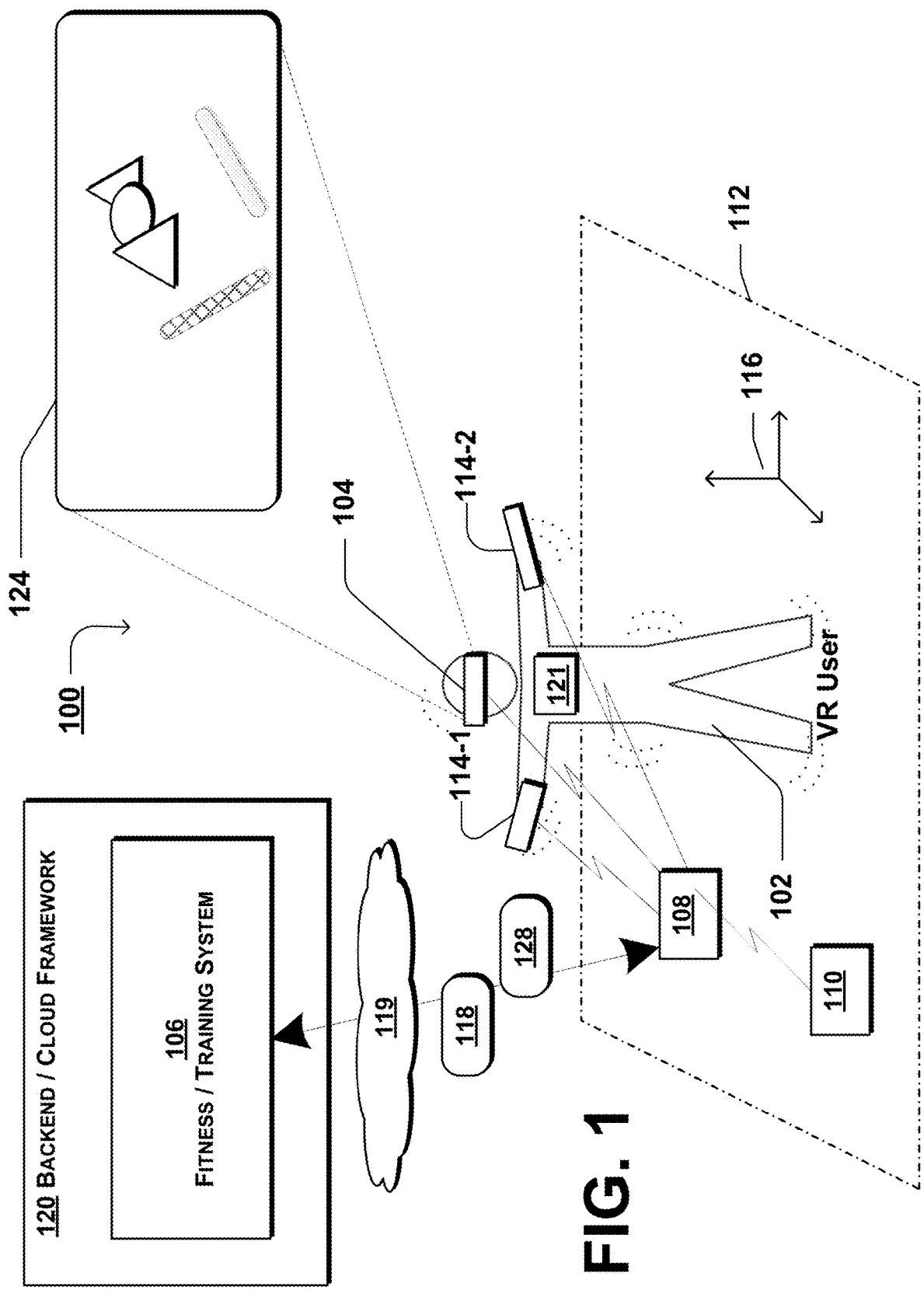
FIG. 1 depicts aspects of a virtual reality personalized and customized training system according to exemplary embodiments hereof.

A system supporting a real-time virtual reality (VR) environment 100 for a virtual and augmented reality personalized and customized fitness training system is described now with reference to FIG. 1, in which a person (VR user) 102 in a real-world environment or space 112 uses a VR device or headset 104 to view and interact with/in a virtual environment. The VR headset 104 may be connected (wired and/or wirelessly) to a training system 106, e.g., via an access point 108 (e.g., a Wi-Fi access point or the like). Since the user's activity may include a lot of movement, the VR headset 104 is preferably wirelessly connected to the access point 108. In some cases, the VR headset 104 may connect to the training system 106 via a user device or computer system (not shown). While shown as a separate component, in some embodiments the access point 108 may be incorporated into the VR headset 104.

Sensors (not shown in the drawings) in the VR headset 104 and/or other sensors 110 in the user's environment may track the VR user's actual movements (e.g., head movements, etc.) and other information. The VR headset 104 preferably provides user tracking without external sensors. In a presently preferred implementation, the VR headset 104 is an Oculus Quest headset made by Facebook Technologies, LLC.

Tracking or telemetry data from the VR headset 104 may be provided in real-time (as all or part of data 118) to the training system 106.

Similarly, data from the sensor(s) 110 may also be provided to the training system 106 (e.g., via the access point 108).

The user 102 may also have one or two handheld devices 114-1, 114-2 (collectively handheld device(s) and/or controller(s) 114) (e.g., Oculus Touch Controllers). Hand movement information and/or control information from the handheld controller(s) 114 may be provided with the data 118 to the training system 106 (e.g., via the access point 108).

In some embodiments, hand movement information and/or control information from the handheld controller(s) 114 may be provided to the VR headset 104 or to another computing device which may then provide that information to the training system 106. In such cases, the handheld controller(s) 114 may communicate wirelessly with the VR headset 104.

In some embodiments, at least some of a user's hand movement information may be determined by tracking one or both of the user's hands (e.g., if the user does not have a handheld controller 114 on/in one or both of their hands, then the controller-free hand(s) may be tracked directly, e.g., using 3D tracking).

Although described here as using one or two handheld controllers 114, those of skill in the art will understand, upon reading this description, that a user may have no handheld controllers or may have only one. Furthermore, even when a user has a handheld controller in/on their hand, that hand may also (or instead) be tracked directly.

The VR headset 104 presents the VR user 102 with a view 124 corresponding to that VR user's virtual or augmented environment.

Preferably, the view 124 of the VR user's virtual environment is shown as if seen from the location, perspective, and orientation of the VR user 102. The VR user's view 124 may be provided as a VR view or as an augmented view (e.g., an AR view).

In some embodiments, the user 102 may perform an activity such as an exercise routine or a game or the like in the VR user's virtual environment. The training system 106 may provide exercise routine information to the VR headset 104. In presently preferred embodiments, the activity system 126 may provide so-called beat map and/or other information 128 to the headset (e.g., via the network 119 and the access point 108).

As the user progresses through an activity such as an exercise routine, the VR headset 104 may store information about the position and orientation of VR headset 104 and of the controllers 114 for the user's left and right hands.

In a present implementation, the user's activity (and a beatmap) is divided into sections (e.g., 20 second sections), and the information is collected and stored at a high frequency (e.g., 72 Hz) within a section. The VR headset 104 may also store information about the location of targets, portals and all objects that are temporally variant, where they are in space, whether any have been hit, etc. at the same or similar frequency. This collected information allows the fitness system to evaluate and/or recreate a scene at any moment in time in the space of that section.

Collected information may then be sent to the training system 106, preferably in real-time, as all or part of data 118, as the user's activity/workout continues, and several of these sections may be sent to the training system 106 over the course of an activity/workout. The data 118 that are provided to the training system 106 preferably include beatmap information.

The training system 106 may be part of backend/cloud framework 120.

The Training System

As explained in greater detail below, in some implementations/embodiments, the fitness training system provides a user with an individualized customized VR training routine, tracks the user as they carry out the routine (in VR), modifies the routine if needed, and provides guidance to the user. The routine may involve the user interacting (virtually) with various objects, and the system may monitor and evaluate the user's interactions and movements in order to determine possible modifications to the routine. The system may also use physiological data (e.g., heartrate data) to evaluate a user during a routine.

Figures 2, 3:
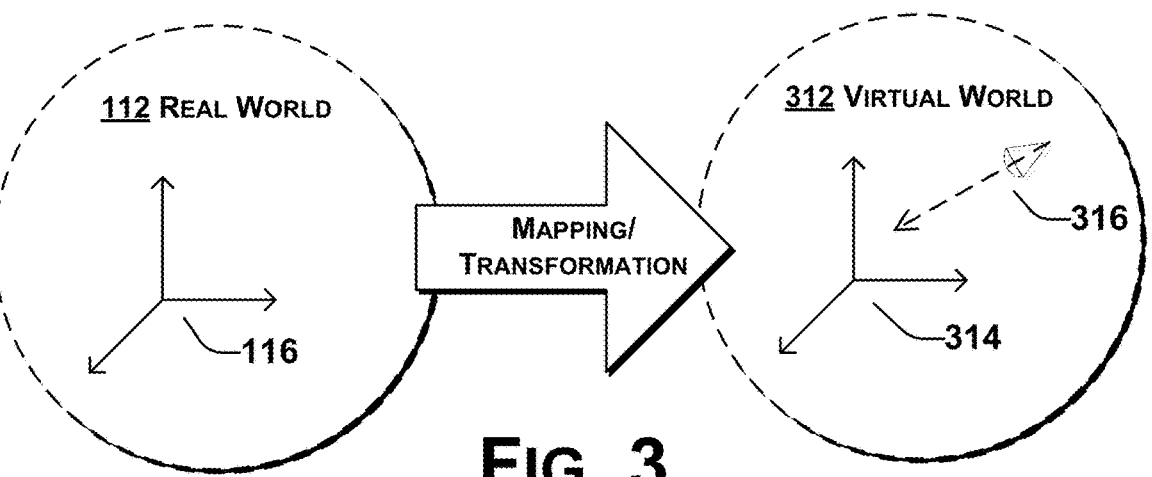
FIG. 2 depicts aspects of a training system according to exemplary embodiments hereof.
FIG. 3 depicts aspects of a mapping and transforming telemetry data according to exemplary embodiments hereof.

With reference to FIG. 2, the training system 106 is a computer system (as discussed below), e.g., one or more servers, with processor(s) 202, memory 204, communication mechanisms 206, etc. One or more video creation programs 210 run on the training system 106. The training system 106 may store data in and retrieve data from one or more data structures 224 in memory 204 and/or from one or more databases (not shown). The databases may include a user database to store and maintain information about users of the system.

Although only one user 102 is shown in FIG. 1, it should be appreciated that the video training system 106 may interact with multiple users at the same time. It should also be appreciated that the following description of the operation of the training system 106 with one user extends to multiple users.

The training programs 210 of the training system 106 may include data collection mechanism(s) 212, movement/tracking mechanism(s) 214, mapping and transformation mechanism(s) 216, calibration mechanism(s) 218, routine generation mechanism(s) 220, and routine evaluation mechanism(s) 222.

The data structures 224 may include a routine data structure 226 and a user data structure 228.

In operation, the data collection mechanism(s) 212 obtain data 118 (FIG. 1) from a user (e.g., user 102 in FIG. 1). The data 118 may include at least some of user movement/telemetry data, information about the location of targets, portals and objects that are temporally variant, where they are in space, whether any have been hit, where and how hard they were hit, etc.

The movement/tracking mechanism(s) 214 determines or approximates, from that data, the user's actual movements in the user's real-world space 112. The user's movements may be given relative to a 3-D coordinate system 116 the user's real-world space 112. If the data 118 includes data from the user's handheld controller(s) 114, the movement/tracking mechanism(s) 214 may also determine movement of one or both of the user's hands in the user's real-world space 112. In some cases, the user's headset 104 may provide the user's actual 3-D coordinates in the real-world space 112.

The movement/tracking mechanism(s) 214 may determine or extrapolate aspects of the user's movement based on machine learning (ML) or other models of user movement. For example, a machine learning mechanism may be trained to recognize certain movements and/or types of movements and may then be used to recognize those movements based on the data 118 provided by the user 102.

With reference to FIGS. 2 and 3, the mapping and transformation mechanism(s) 216 (FIG. 2) may take the movement/tracking data (as determined by the movement/tracking mechanism(s) 214), and transform those data from the real-world coordinate system 116 in the user's real-world space 112 to corresponding 3-D coordinates in a virtual-world coordinate system 314 in a virtual world 312.

Those of skill in the art will understand, upon reading this description, that the mapping and transformation mechanism(s) 216 may operate prior to or in conjunction with the movement/tracking mechanism(s) 214. As with all mechanisms described herein, the logical boundaries are used to aid the description and are not intended to limit the scope hereof.

For the sake of this description, the user's movement data in the real-world space 112 are referred to as the user's real-world movement data, and the user's movement data in the virtual-world space 312 are referred to as the user's virtual movement data.

In some embodiments, the training system 106 may also receive or have other user data (e.g., physiological data or the like) and may use some of the physiological data (e.g., heartrate, temperature, sweat level, breathing rate, etc.) to determine or evaluate the user's movements and actions in the virtual space. Such physiological data may be obtained by one or more sensors 121 worn by and/or monitoring the user. The sensors 121 may be incorporated into another device such as a watch or the like worn by the user. For example, the sensors 121 may include a heartrate monitor included in an Apple Watch worn by the user.

The training system 106 may be co-located with the user (e.g., in the same room), or it may be fully or wholly located elsewhere. For example, the training system 106 may be located at a location distinct from the user, in which case the user's data 118 may be sent to the training system 106 via a network 119 (e.g., the Internet). Although in preferred cases the user's data 118 are provided to the training system 106 as the data are generated (i.e., in real-time), in some cases, the user's data 118 may be collected and stored at the user's location, and then sent to the training system 106. When located apart from the user, and accessed via a network, the training system 106 may be considered to be a cloud-based system.

Routines

As noted above, the fitness training system may provide a user with an individualized customized VR training routine. A user's routine may be stored in a routine data structure 226 in the memory 204 of the training system 106.

Figure 4A:
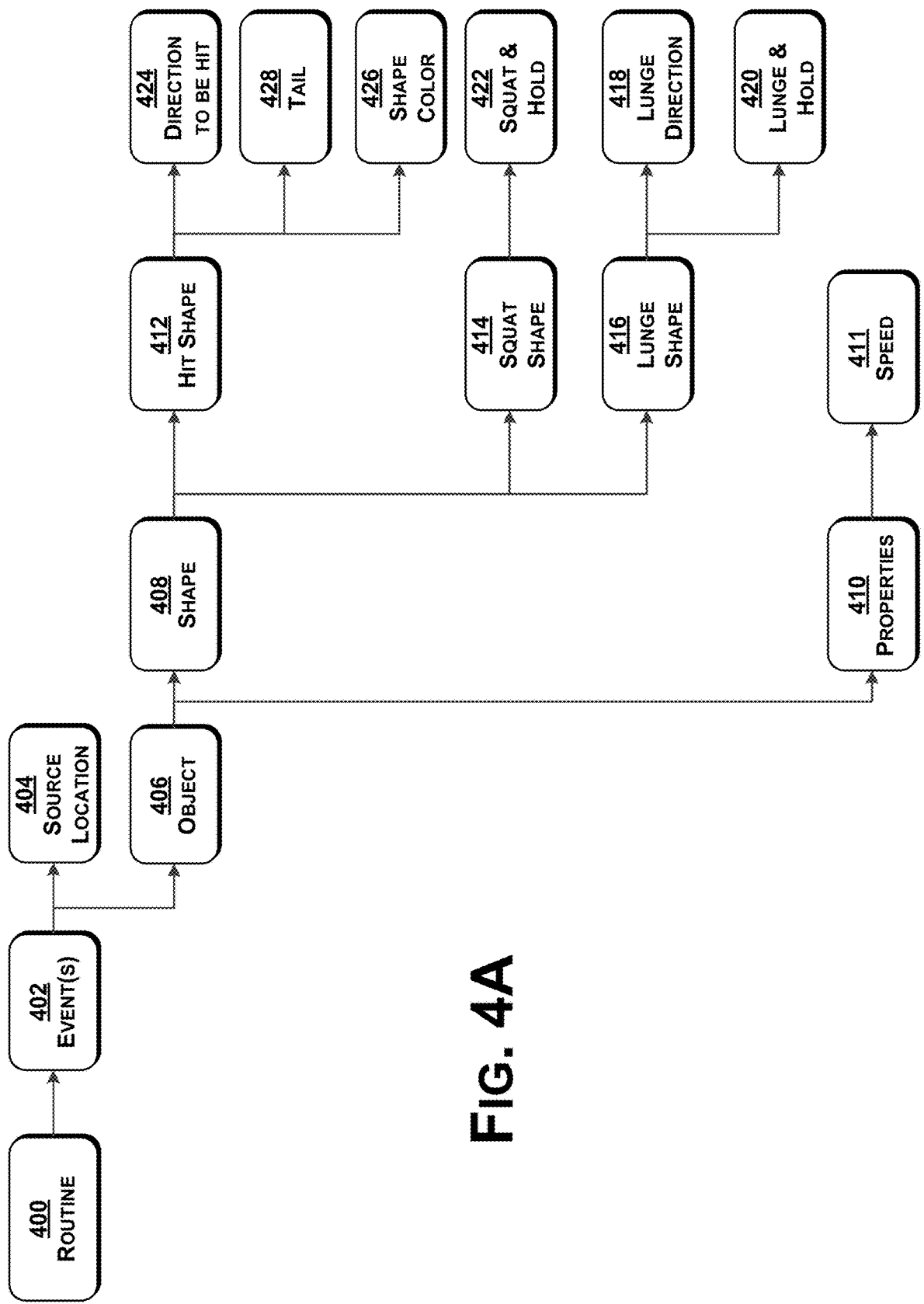
FIGS. 4A-4B depict aspects of exemplary data structures for a training system according to exemplary embodiments hereof.

With reference to FIG. 4A, a routine 400 may comprise a time-ordered series of events 402. An event 402 may comprise a source location 404 and an object 406.

An object 406 may comprise a shape 408 and properties 410. Some properties may be shape-specific, as described below.

A shape 408 may be a hit shape 412 (e.g., an orb or circle or the like) or a squat shape 414 (e.g., a symmetric triangle) or a lunge shape 416 (e.g., an oblique or asymmetric triangle).

A lunge shape 416 may have a lunge direction 418 (left or right), and may thus be a left lunge shape or a right lunge shape.

A squat shape 414 or lunge shape 416 may also include a "hold" shape 420, 422, which may include a hold duration (not shown).

The properties 410 of a shape may include its speed 411 (i.e., the speed at which the object or shape approaches the user in VR).

A hit shape 412 may include a direction indicator 424, showing the direction in which the shape should be hit. A hit shape 412 may include a color 426 or other indicator showing which hand should be used to hit the shape.

Recall that the user preferably has two controllers 114-1 and 114-2 (see FIG. 1). As shown, e.g., in FIG. 6A, in VR the controllers are represented to the user (on their display 124) as batons or sticks 614-1 and 614-2 or the like in two colors (e.g., black and white). The user should try to hit a hit shape with the controller that matches the color of the shape. Thus, e.g., the user should try to hit black hit shape objects with their black controller and white hit shape objects with their white controller. Although the controllers may be represented to the user as batons or sticks, those of skill in the art will understand, upon reading this description, that any shape or object, real or virtual, may be used to represent the controllers. Furthermore, in cases where the user has one or no controllers, the system may track one or both of the user's hands directly (e.g., in 3D) and may represent the user's hands in VR as hands or as objects such as sticks, batons, etc.

A hit shape 412 may include an arc or tail 428, indicating the type of hit to be used to hit the shape (e.g., a flowing or follow-through hit).

Those of skill in the art will understand, upon reading this description, that different and/or other shapes and/or shape properties may be used.

Example hit shapes 412A-412H are shown in FIGS. 5A-5I, each showing a corresponding hit direction 424A-424H. For example, the hit shape 412A may comprise an orb with a triangular shaped direction 424A, indicating that the user should hit the object (the orb) in the direction of the arrow A. Generally, the apex of the triangular direction identifier shows the direction in which the object should be hit.

Figure 5I:
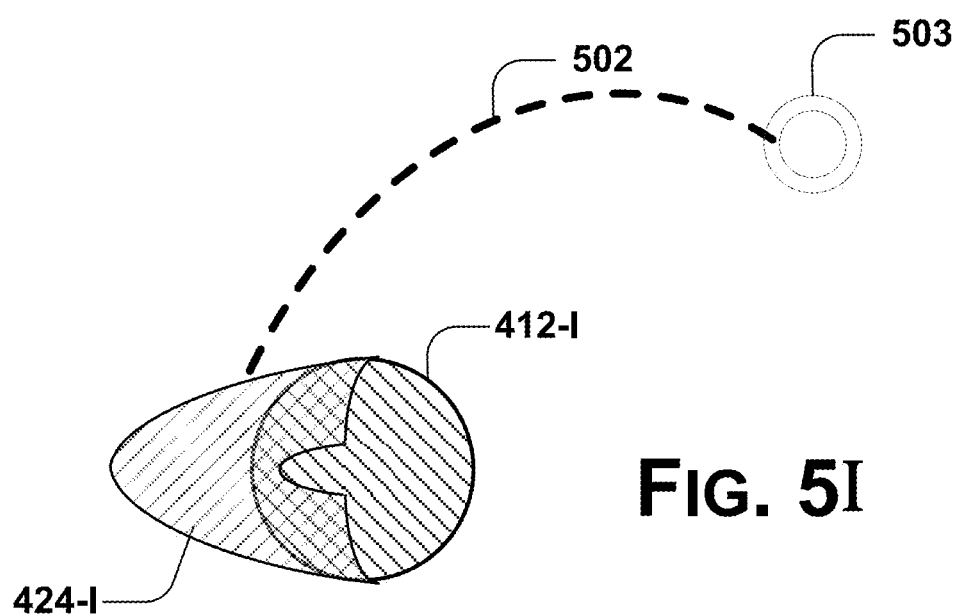
FIGS. 5A-5N depict exemplary objects for a training system according to exemplary embodiments hereof.

FIG. 5I shows an example of a hit shape 412-I with corresponding direction indicator 424-I and an arc 502. The arc 502 may extend from the source 503 of the object. When a hit shape has an arc, the user should hit the object in the direction indicated by the object indicator 424-I and the user should follow through the hit with an arcing motion (instead of just stopping when they contact the object), as indicated by the arc 502. A similar situation is shown in the screen shot in FIG. 9B.

Figure 5J:
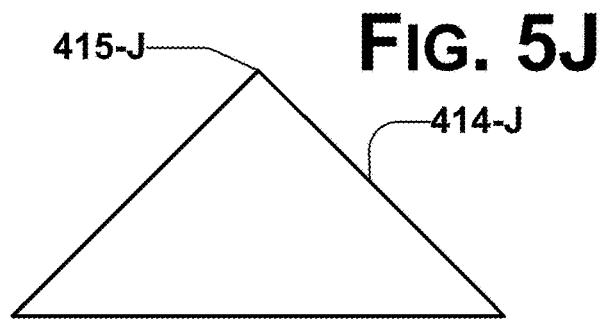

FIG. 5J shows an exemplary squat shape 414-J. As shown, a squat shape is preferably a symmetric triangle with an apex 415-J. When a user is presented with a squat shape 414-K (i.e., when a squat shape approaches a user in VR), the user should try to squat so that the user's head passes inside the squat shape, below the apex 415-J (e.g., inside the triangle).

Figure 5K:
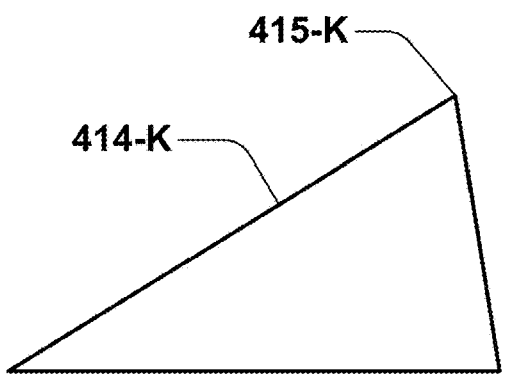
Figure 5L:
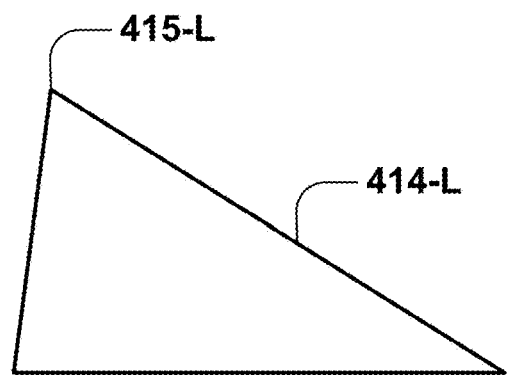

FIGS. 5K and 5L show right and left lunge shapes 414-K, 414-L, respectively, with corresponding apexes 415-K and 415-L, respectively. As shown, a lunge shape is preferably an asymmetric triangle, with the shorter side of the triangle indicating the desired lunge direction. When a user is presented with a lunge shape (i.e., when a lunge shape approaches a user in VR), the user should try to lunge in the direction indicated by the lunge shape so that they user's head passes inside the lunge shape, below the triangle's apex (e.g., inside the triangle). So, e.g., for a left lunge shape 414-L, the user should try to lunge to the left and lunge deep or low enough to have their head pass thorough the lunge shape, below the apex 415-L. Exemplary squat and lunge shapes are shown in the screen shots in FIGS. 12A-12C, 13A-13C, and 14A-14C.

Figure 5M:
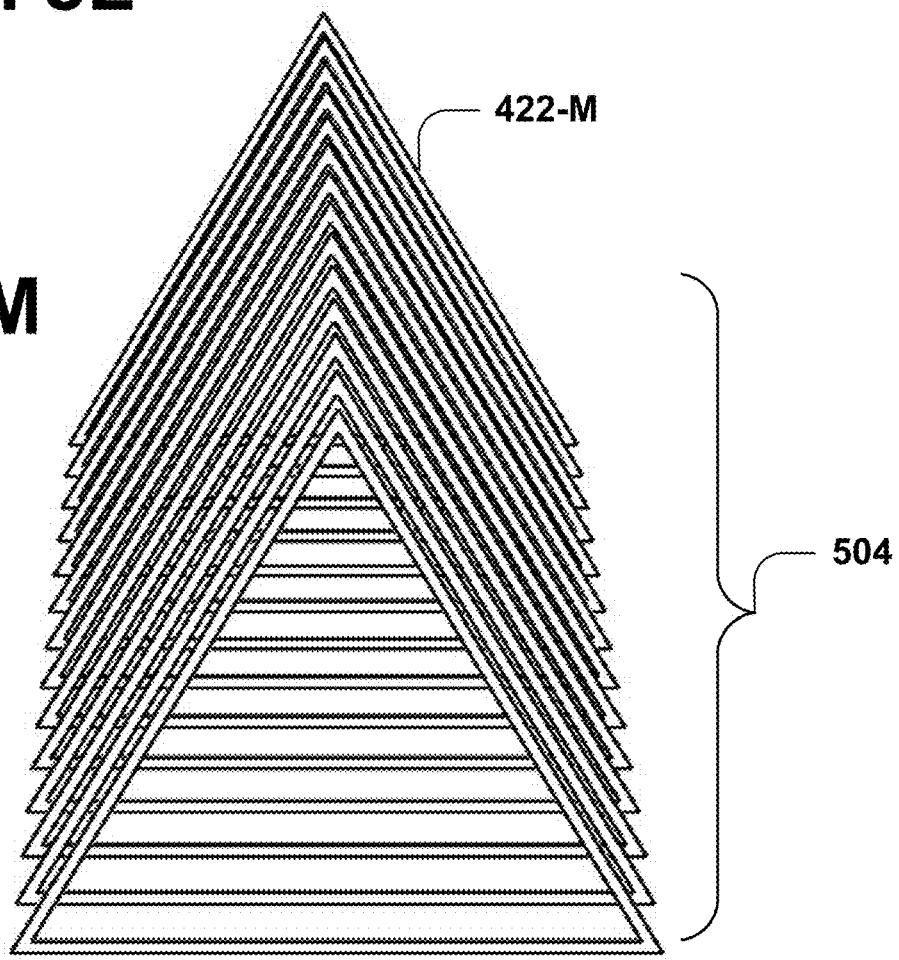

FIG. 5M shows an exemplary squat and hold shape, having a squat shape 422M and a hold portion 504. The squat portion 422M has the same role as the squat shape 414J described above. The hold portion 504 indicates that the user should try to hold the squat until the hold portion has passed by (in VR). Lunge shapes may also include hold portions, in which case the user should try to hold their lunge until the lunge portion has passed.

The hold portion 504 may be represented by a series of repeating triangles, each of whose respective apex may be positioned in the same position as the other adjacent triangles, or in different positions. In the latter case, the user will be instructed to squat and lunge in different directions based on the location of the apex of each triangle as each triangle passes by the person. In each case, the person must position their head (VR headset) so that their head in the virtual world passes below, and adjacent to each respective apex of each passing triangle. Exemplary squat-and-hold shapes are shown in the screen shots in FIGS. 15A-15B.

Figure 5N:
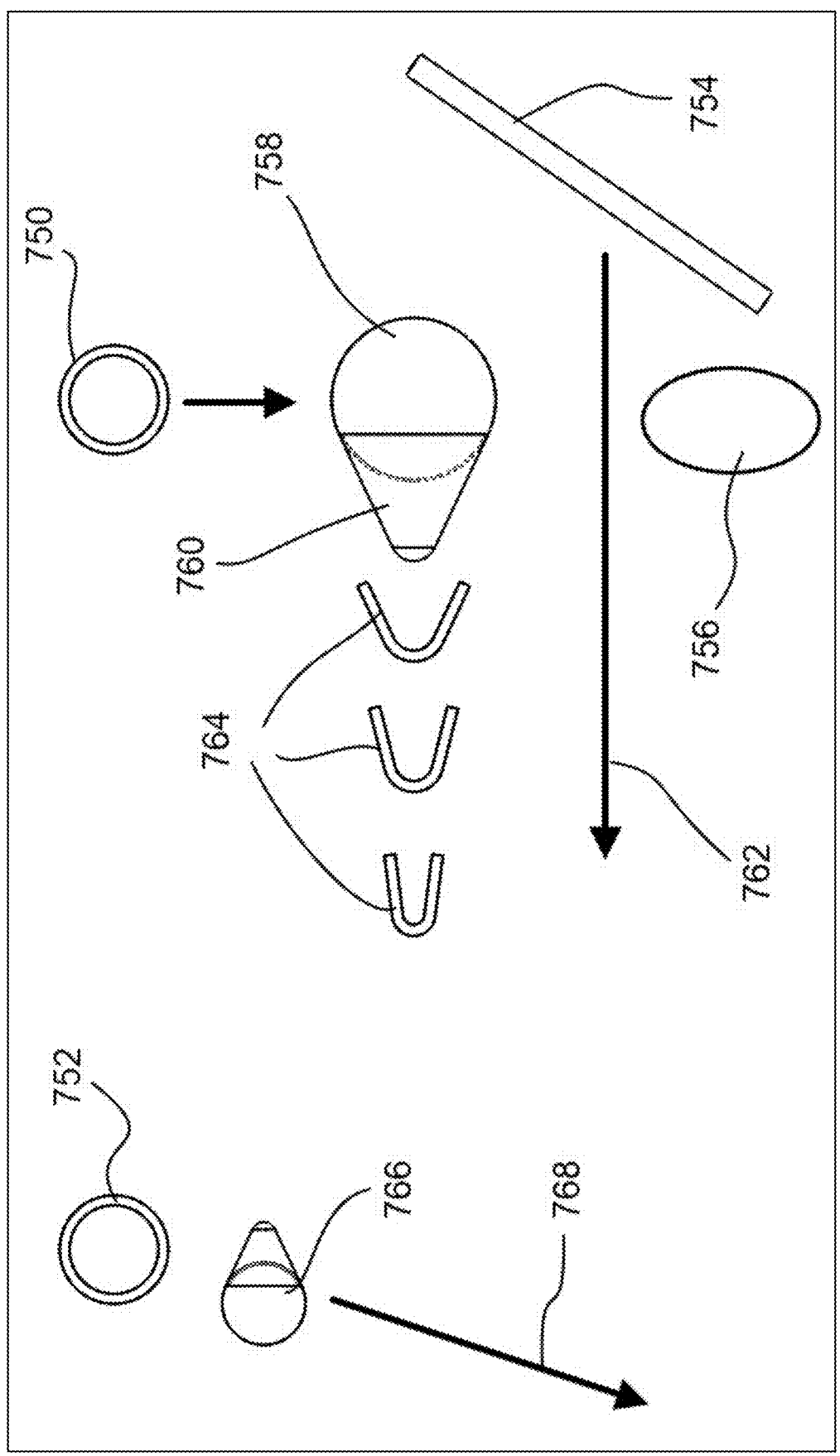

FIG. 5N is an illustration depicting an exemplary portal transition, according to embodiments hereof. FIG. 5N shows a portal-transition period during a workout wherein a first portal 750 may be deactivated (turned off, closed), while an adjacent second portal 752 may be activated (turned on, opened). The second portal 752 may be activated simultaneously with the closing of the first portal 750. The second portal 752 may open either to the left or the right of the first portal 750, in the virtual world and may be at the same height or higher or lower than the first portal 750. During this transition, a baton 754, held by a player 756 is being used to hit a final hit object 758 from first portal 750. According to another aspect, the final hit object 758 from a closing first portal 750 may include a hit direction indicator 760 that is directed towards an adjacent opening second portal 752. The direction indicated by the hit-direction indicator 760 instructs or guides the player 756 to hit the hit-object 758 in the direction of arrow 762, which is pointing to the left, in this example. For some implementations, the hit-direction indicator 760 may also be pointing to the opening second portal 752. Additional directional indicators 764 may be included immediately adjacent to the hit object 758, between the hit object 758 and the newly opening second portal 752, and pointing in the direction of the newly opening second portal 752.

As should be appreciated, this feature allows the player 756 to be automatically oriented in front of the adjacent second portal 752, just as the second portal opens and may have already sent its first second-portal hit object 766 towards the player 756 (indicated by arrow 768 in the drawing). Owing to the speed of a typical workout, according to this system, this opening-portal-indication feature allows the player "just in time" knowledge of the location of emerging portals opening up (to the left, or to the right) in such a manner as to allow the player to maintain a smooth and fluid movement during their workout, with less risk of missing a hit object. Any number of new portals may open and close, preferably with only two portals being opened at the same time during a portal transition, as described above. While the hit direction indicator 760 and the additional directional indicators 764 may appear on the user's display, the arrows 762 and 768 in FIG. 5M are for purposes of explanation, and would not appear on the user's display.

While the hit direction indicators and the additional directional indicators may be used, as described here, to indicate a portal opening, those of skill in the art will understand, upon reading this description, that they may be used even when another portal is not opening or when another portal is already open.

Figure 9A:
Figure 9B:
Figure 9C:
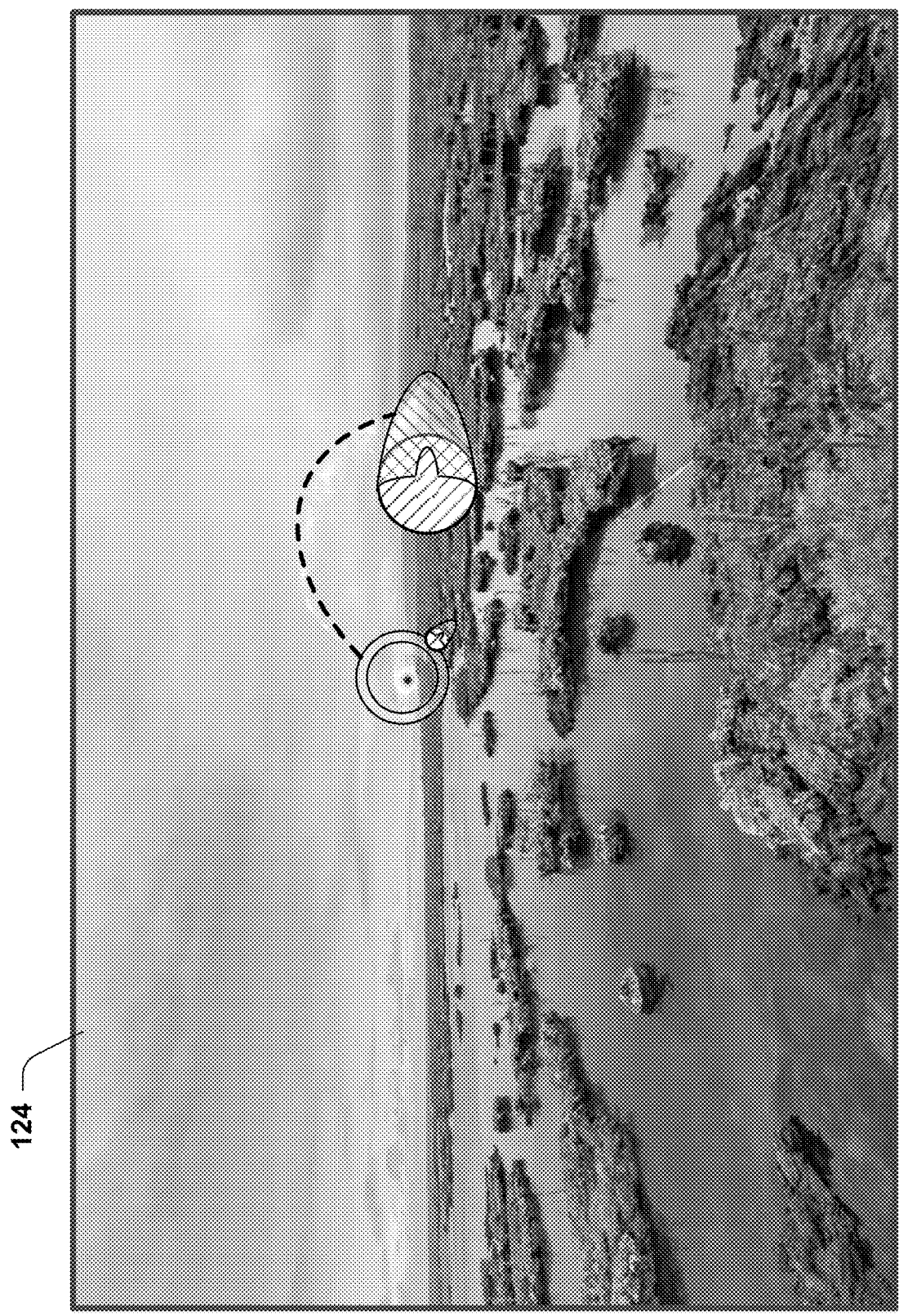
Figure 9D:
Figure 9E:
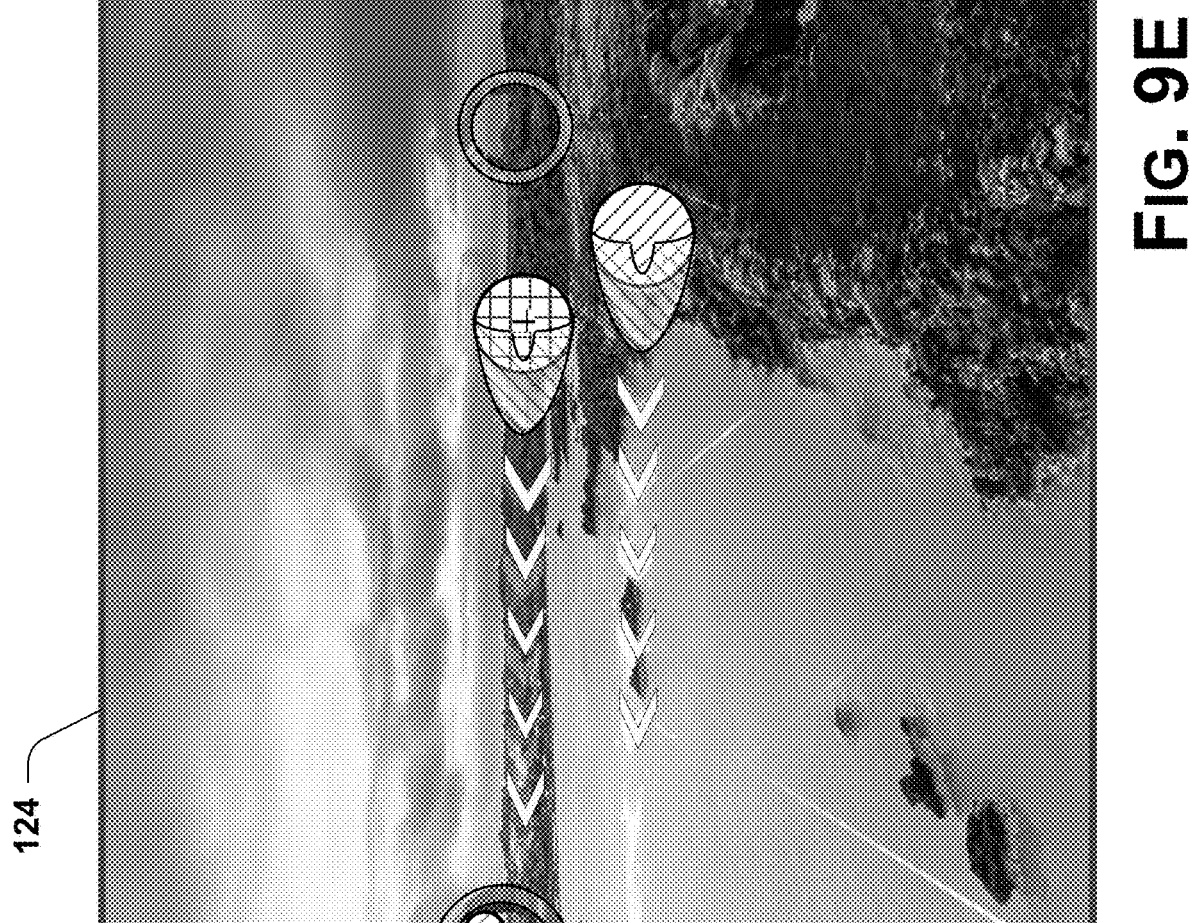

A screen shot showing hit direction indicators and the additional directional indicators is also shown in FIG. 9E.

User Information

As noted, the training system 106 databases may include a user database to store and maintain information about users of the system. The training system 106 may use information about a user in order to customize and/or modify a user's routines. The user data may include some or all of the data shown in the user data structure 430 in FIG. 4B. In particular, user data may include the user's height 432, vertical reach 433, age 434, gender 436, mass/weight 438, left reach 440, and right reach 442. The user may input some of the information (e.g., their age and gender). As described below, some of the user information (e.g., height 432, vertical reach 433, left reach 440, and right reach 442) may be determined dynamically by the training system 106, e.g., during a calibration phase.

The user data may include user statistics 444 from prior and current training sessions. The user statistics 444 may include scores 446, including hit scores 448, squat scores 450, lunge scores 452, and other scores 454. The statistics 444 may also include some of the user's physiological information 456 (e.g., the user's heartrate, temperature, sweat level, breathing rate, etc., as determined from one or more sensors such as sensors 121 shown in FIG. 1).

The user data may also include other miscellaneous data 458.

EXAMPLES

Various example interactions are shown with reference to FIGS. 6A-6M. These examples are shown from the user's point of view, as presented on the user's display 124. The user is considered to be at the bottom center of the display, with images corresponding to their controllers 614-1 and 614-2 sometimes visible.

Figure 6A:
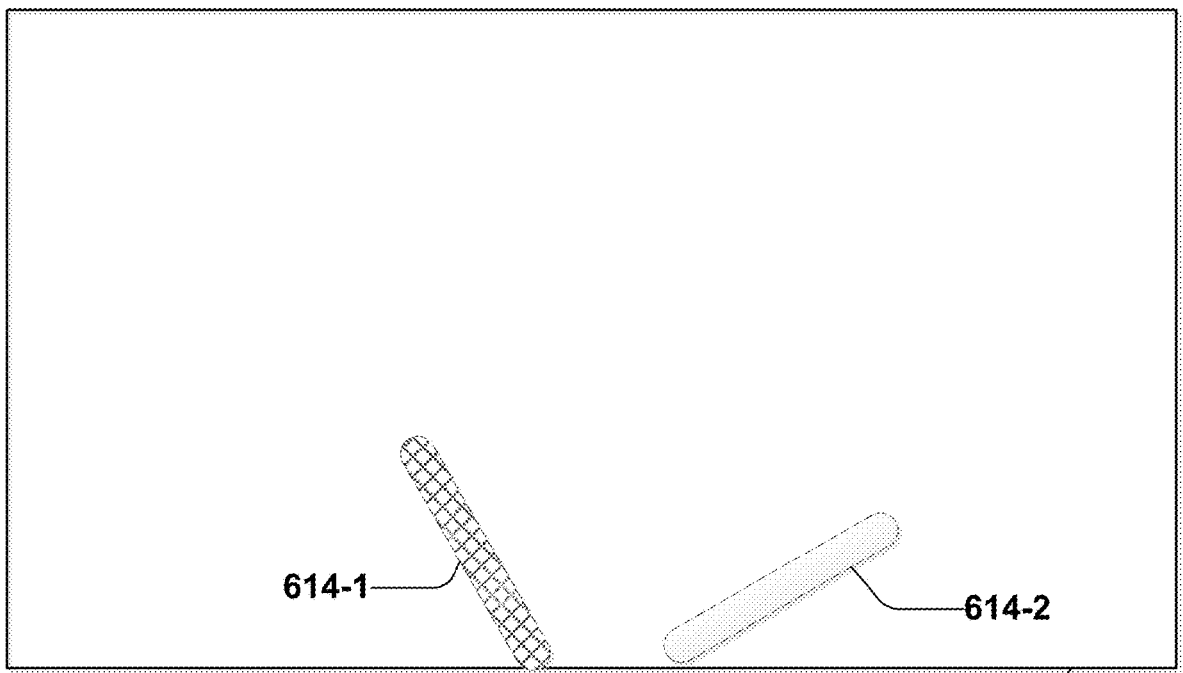
FIGS. 6A-6H depict aspects of the virtual reality personalized and customized training system according to exemplary embodiments hereof.

The controllers 614-1 and 614-2 may be rendered on the user's display in different ways (e.g., a sticks, batons, paddles, bats, racquets, gloves, etc.), and that the rendering may vary with the activity and/or the user's skills. For example, an unskilled user may be given larger (or wider) paddles with which to hit objects. As should be appreciated, the system may also need to adjust a hit-accuracy threshold to accommodate unskilled users, so that more hits may be achieved. FIG. 6A shows the user's view of their controllers 614-1 and 614-2, in this case as sticks or batons. As used herein, the user's controllers 614-1 and 614-2 are sometimes used synonymously with their representations depicted on the display. Thus, e.g., if a controller is depicted as a stick, then a statement that an object was hit by the stick may also be given as the object was hit by the controller.

Figure 6B:
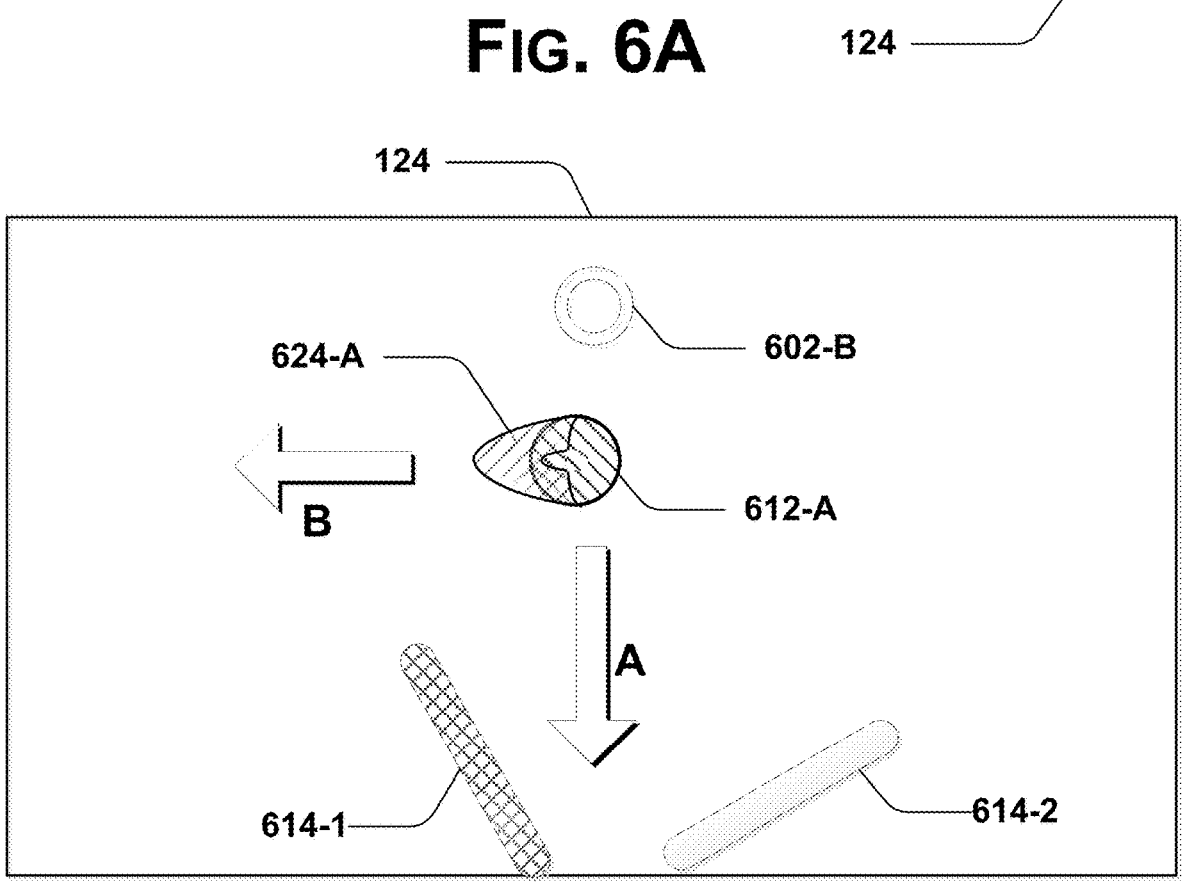

In the example in FIG. 6B, the system sends a hit object 612A towards the user from a portal 602B, as shown by the arrow A. The portal 602B is the source of the hit object. The hit object 612A has a hit direction indicated by the triangular shape 624A. The hit object 612A has the same color as the user's left controller 614-1. The user should try to hit the hit object 612A with their left controller 614-1 in the direction of the arrow B. FIG. 9B shows a screen shot of an exemplary hit object.

When the user hits the object (in the VR space), the object will move in the direction it has been hit and/or explode or disintegrate (see, e.g., FIGS. 10A-10E, 11A-11C). Various VR effects may be used after an object is hit. For example, if the user misses the object, then the object may appear to move/fly past the user or bounce to the side.

When a user successfully hits a hit object in the correct direction with the correct controller (baton), the user's hit score 448 may be increased. The user may be given a higher score based on how hard they hit the object.

Figure 6C:
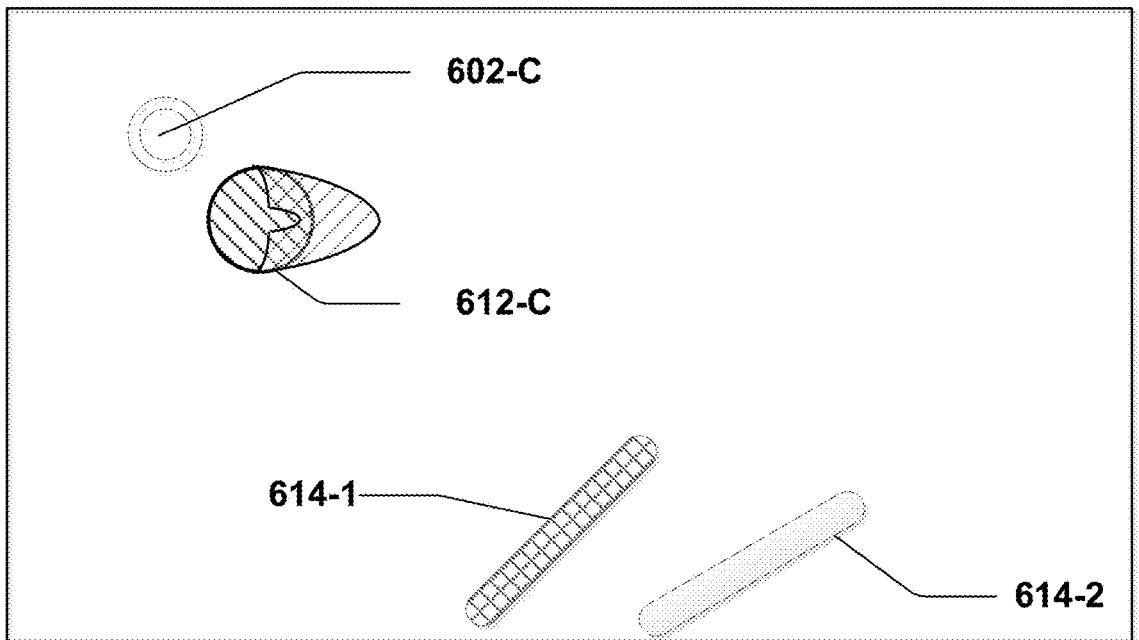

In the example in FIG. 6C, the system sends a hit object 612C towards the user from a portal 602C. The object has the same color as the user's right baton (corresponding to the right controller 614-2), and so the user should try to hit the object 612C in the direction indicated by the triangular shape 624C.

Note that in the example in FIG. 6C the portal 602C is not in the same location as portal 602B in FIG. 6B. The portal corresponds to the source of the object and a particular routine may use multiple portals in multiple distinct locations.

Figure 6D:
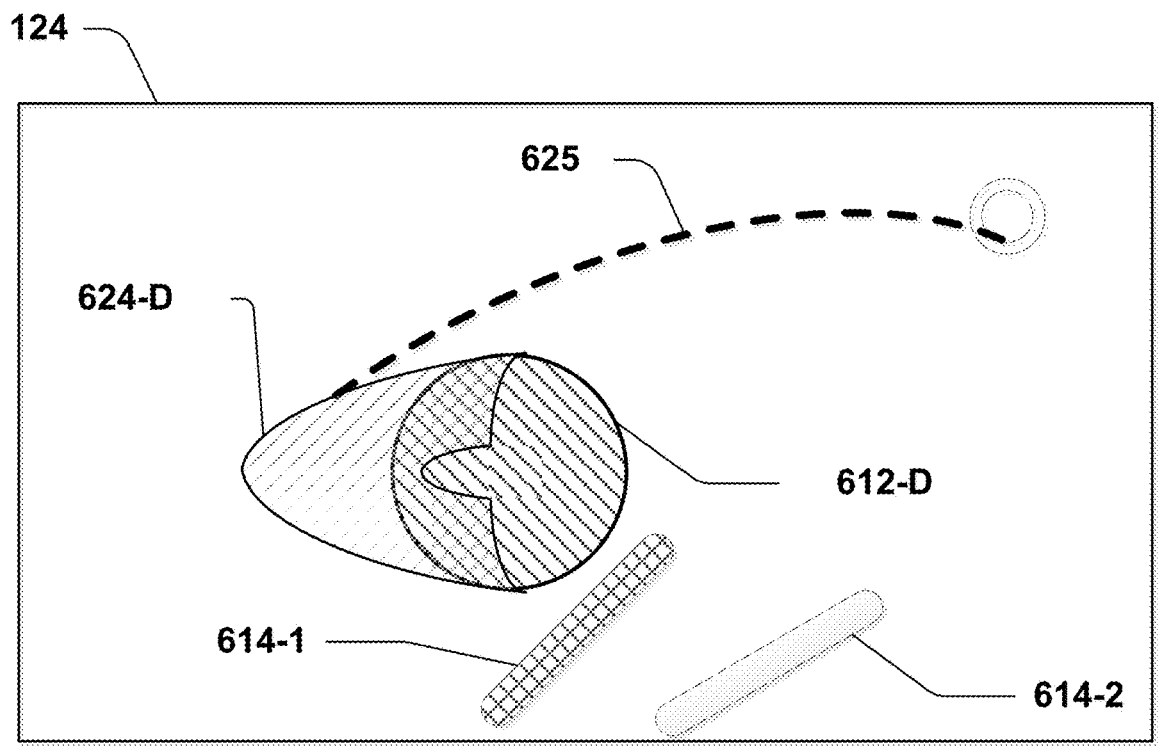

In the example in FIG. 6D, the system sends a hit object 612D towards the user from a portal 602D. The hit object 612D has a tail (or arc) 625D. To successfully interact with this hit object, the user should try to hit the hit object 612D with their left baton (based on the matching colors of the object and the baton) in the direction of the triangular shape 624D. The tail 625D indicates that the user should follow through with the hit, preferably with a flowing motion, generally following the shape of the particular tail. FIGS. 9B and 9C show exemplary hit objects with tails.

Figure 6E:
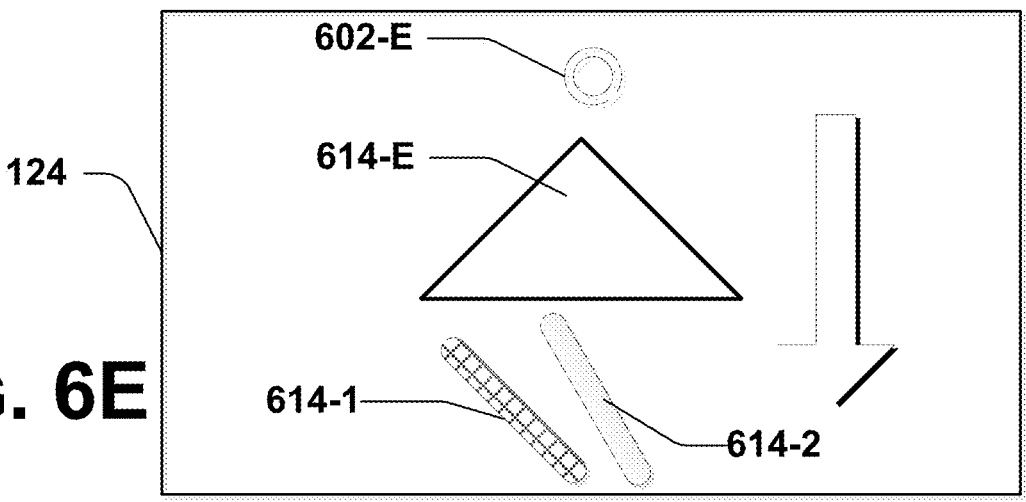
Figure 12C:
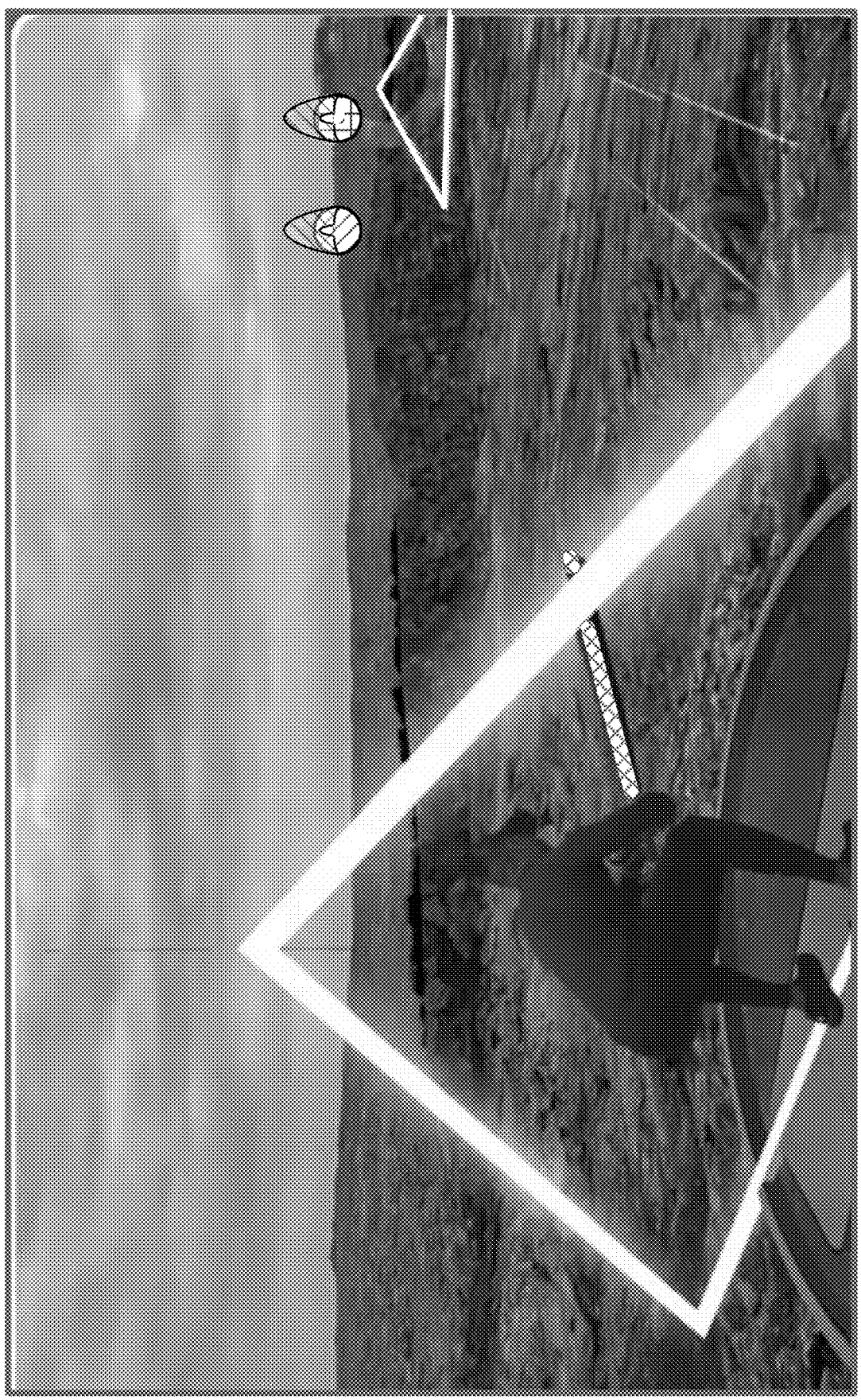

In the example in FIG. 6E, the system sends a squat shape 614E towards the user from a portal 602E. In response, the user should try to squat into the object so that the user appears to pass through the object in VR space. By determining, e.g., the height and position of the user's head, the system can determine how well they squatted, and the system may adjust their squat score(s) 450 accordingly. FIGS. 12A-12C show examples of a user squatting to pass through a squat object.

Figure 6F:
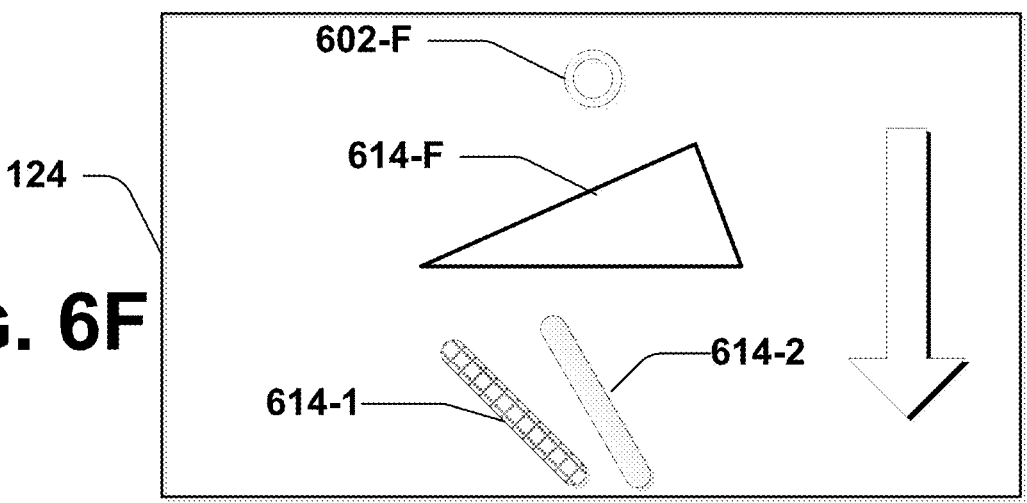
Figure 6G:
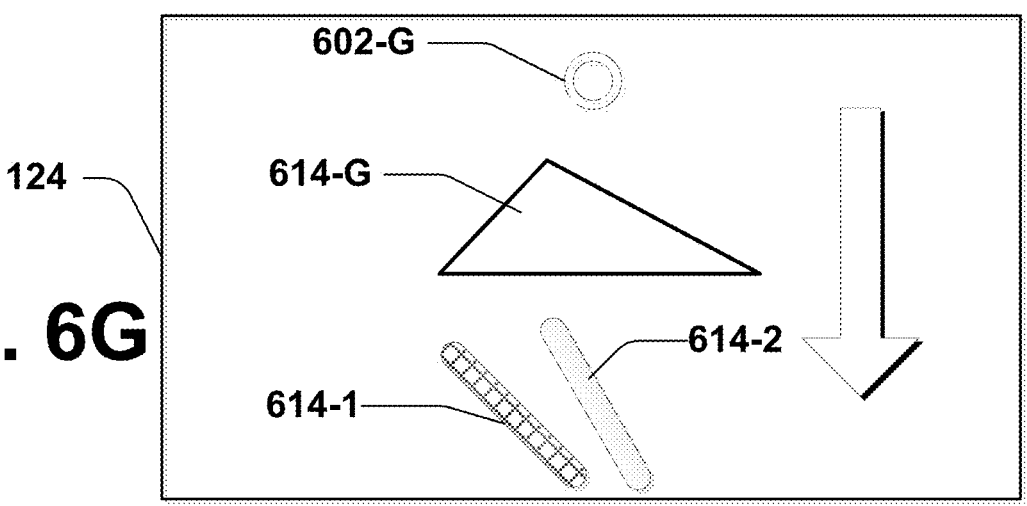
Figure 13A:
Figure 14A:
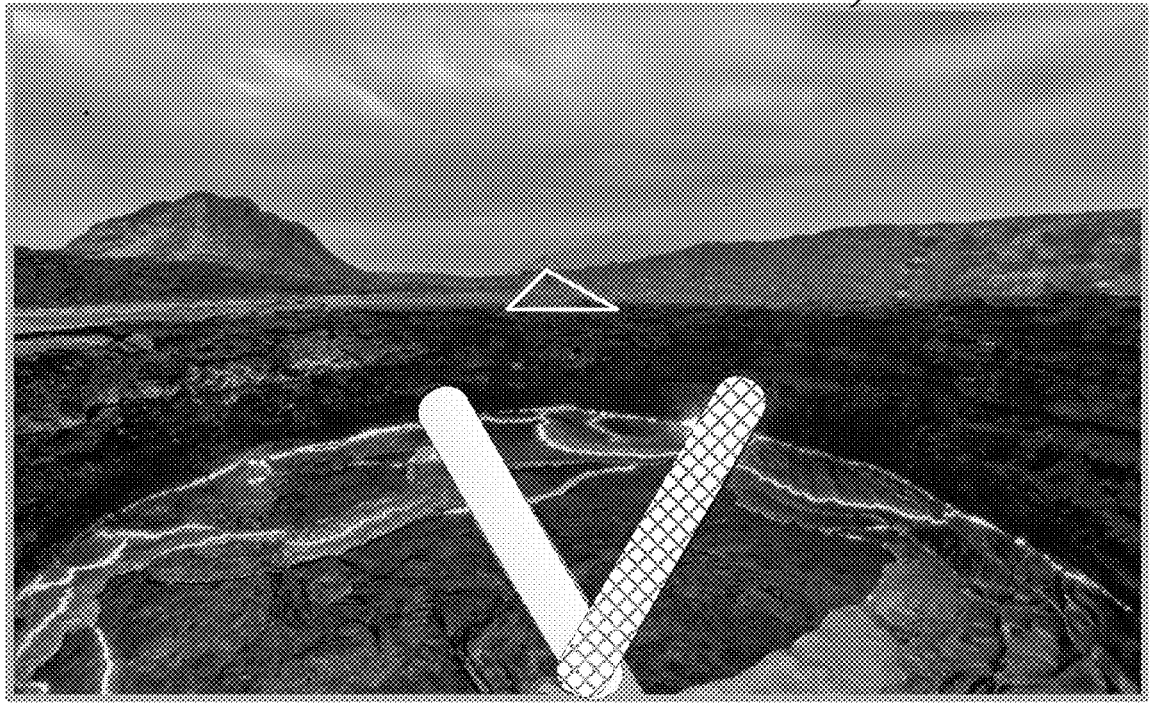
Figure 14B:
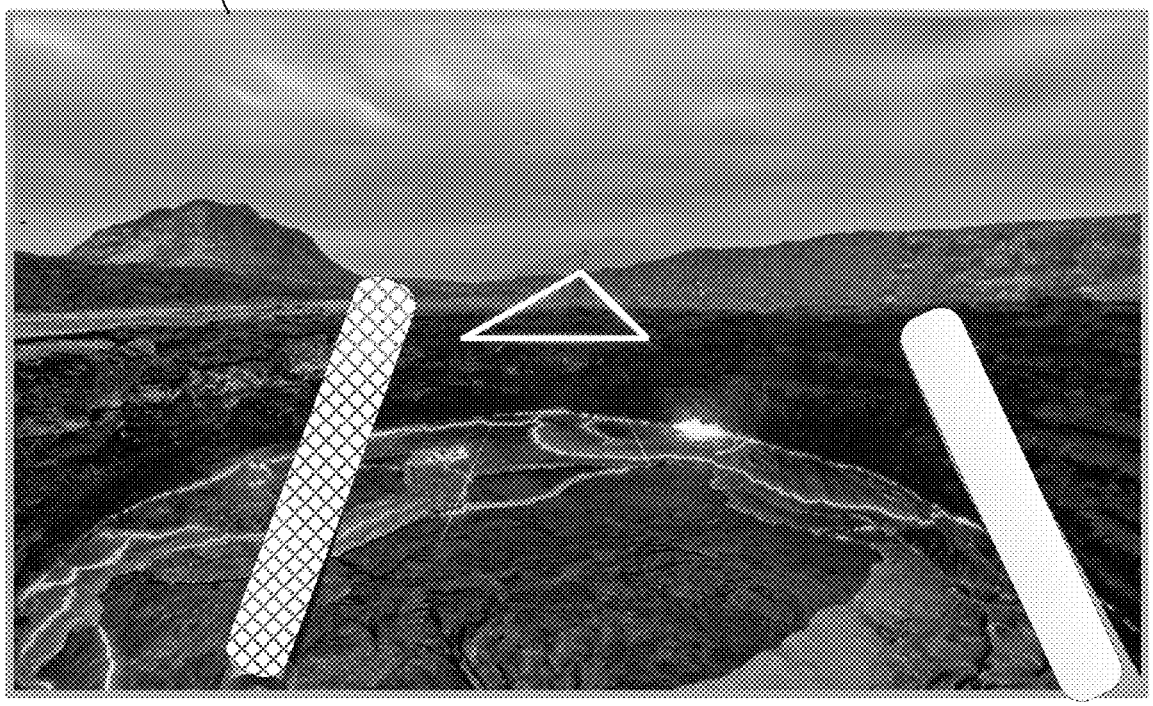
Figure 14C:
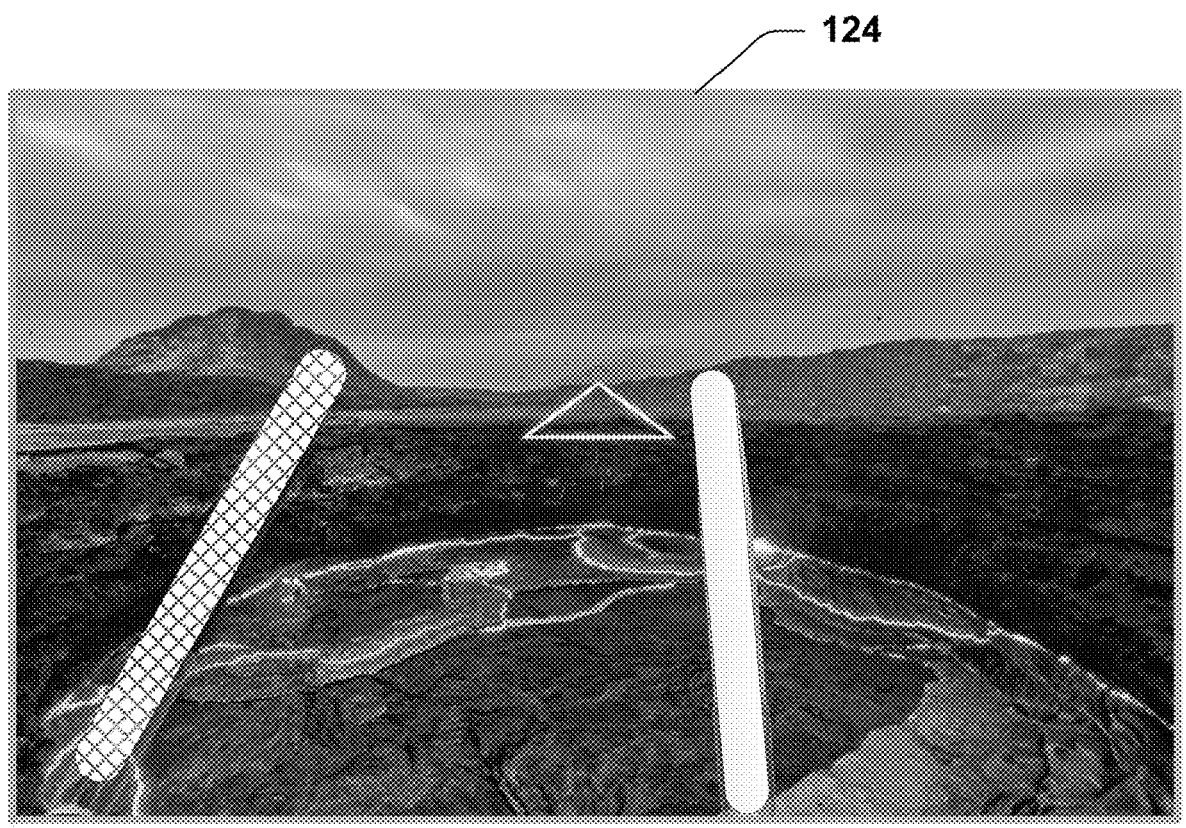

In the example in FIG. 6F, the system sends a right lunge shape 614F towards the user from a portal 602F. In response, the user should try to lunge to the right so that the user appears to pass through the shape 614F in VR space. By determining, e.g., the height and position of the user's head, the system can determine how well they lunged, and the system may adjust their lunge score 452 accordingly. Similarly, in the example in FIG. 6G, the system sends a left lunge shape 614G towards the user from a portal 602G. In response, the user should try to lunge to the left so that the user appears to pass through the shape 614G in VR space. By determining, e.g., the height and position of the user's head, the system can determine how well they lunged, and the system may adjust their lunge score(s) 452 accordingly. FIGS. 13A-13C show examples of a user squatting to pass through a squat object.

Figure 6H:
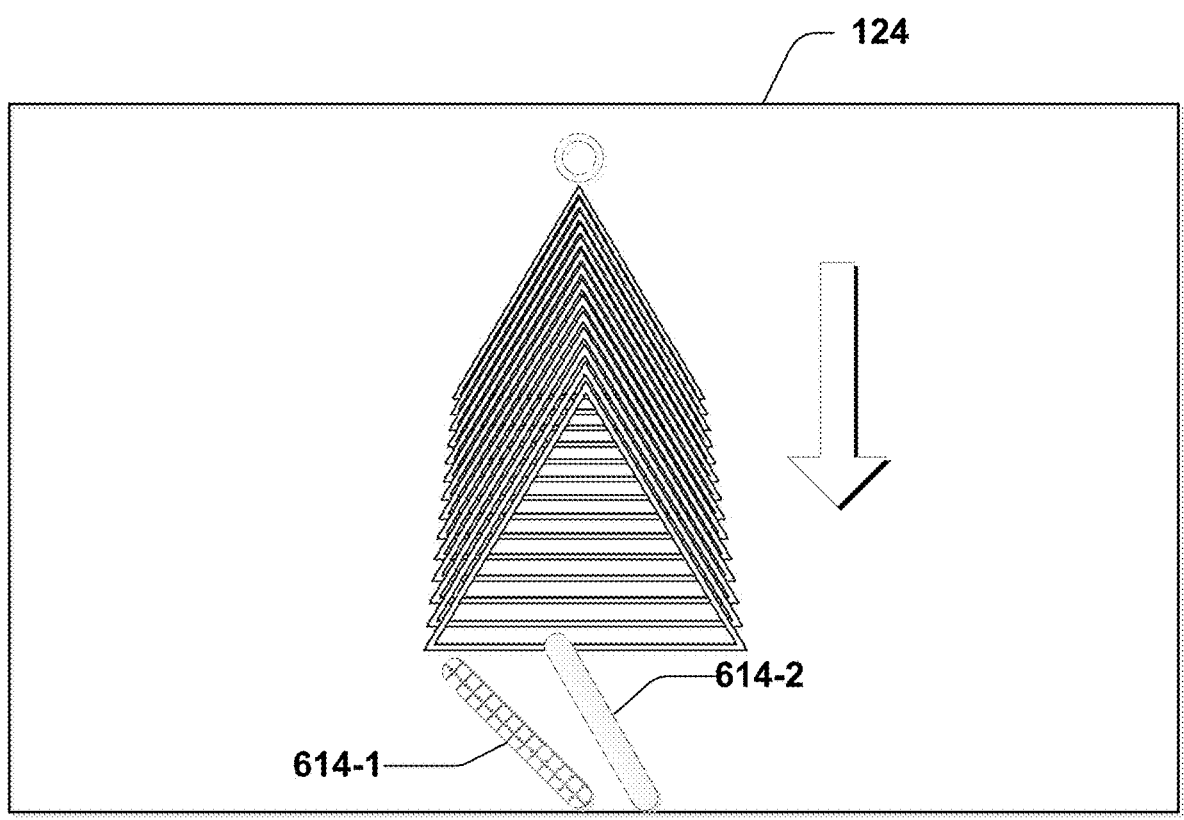
Figure 15A:
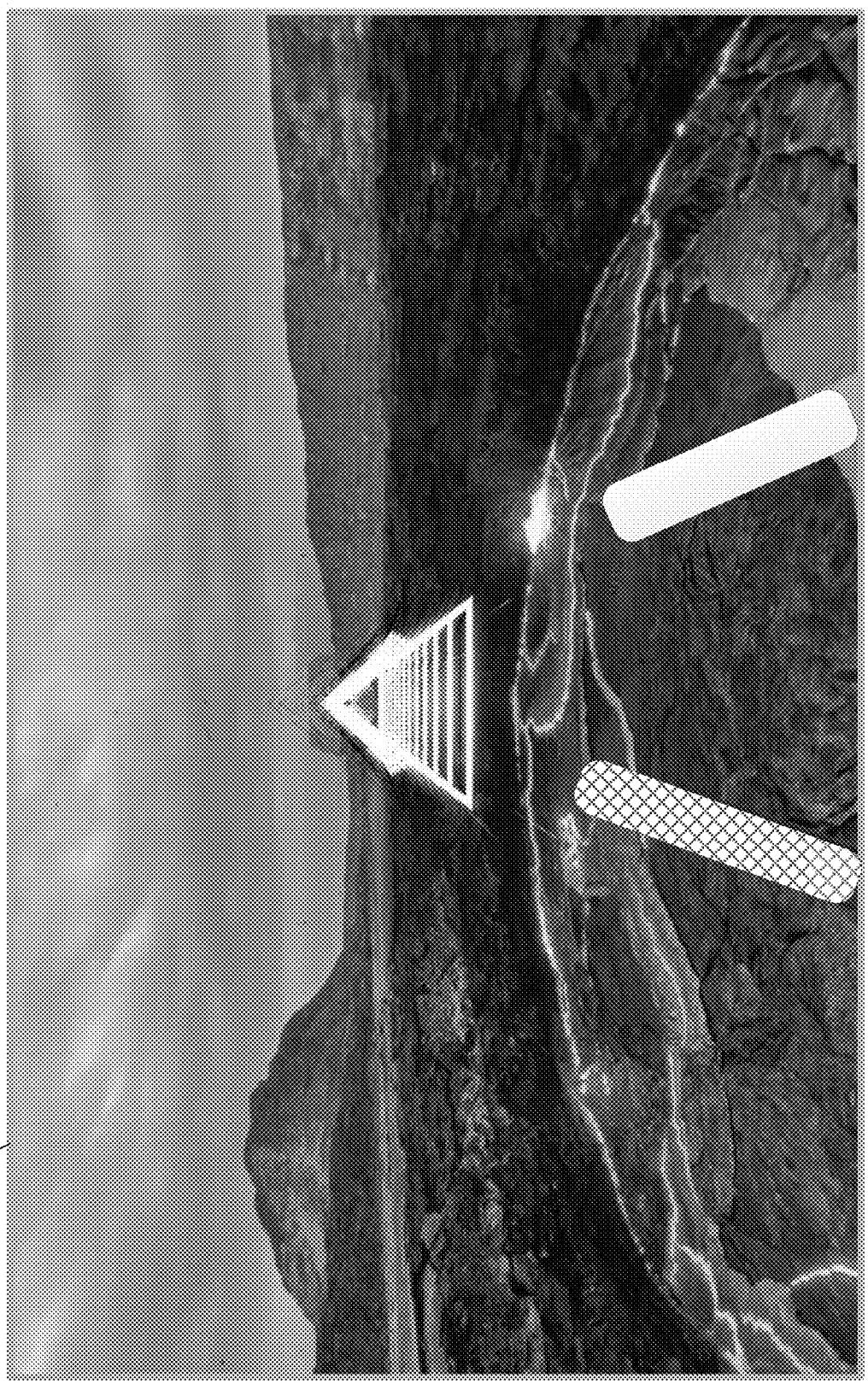
Figure 15B:
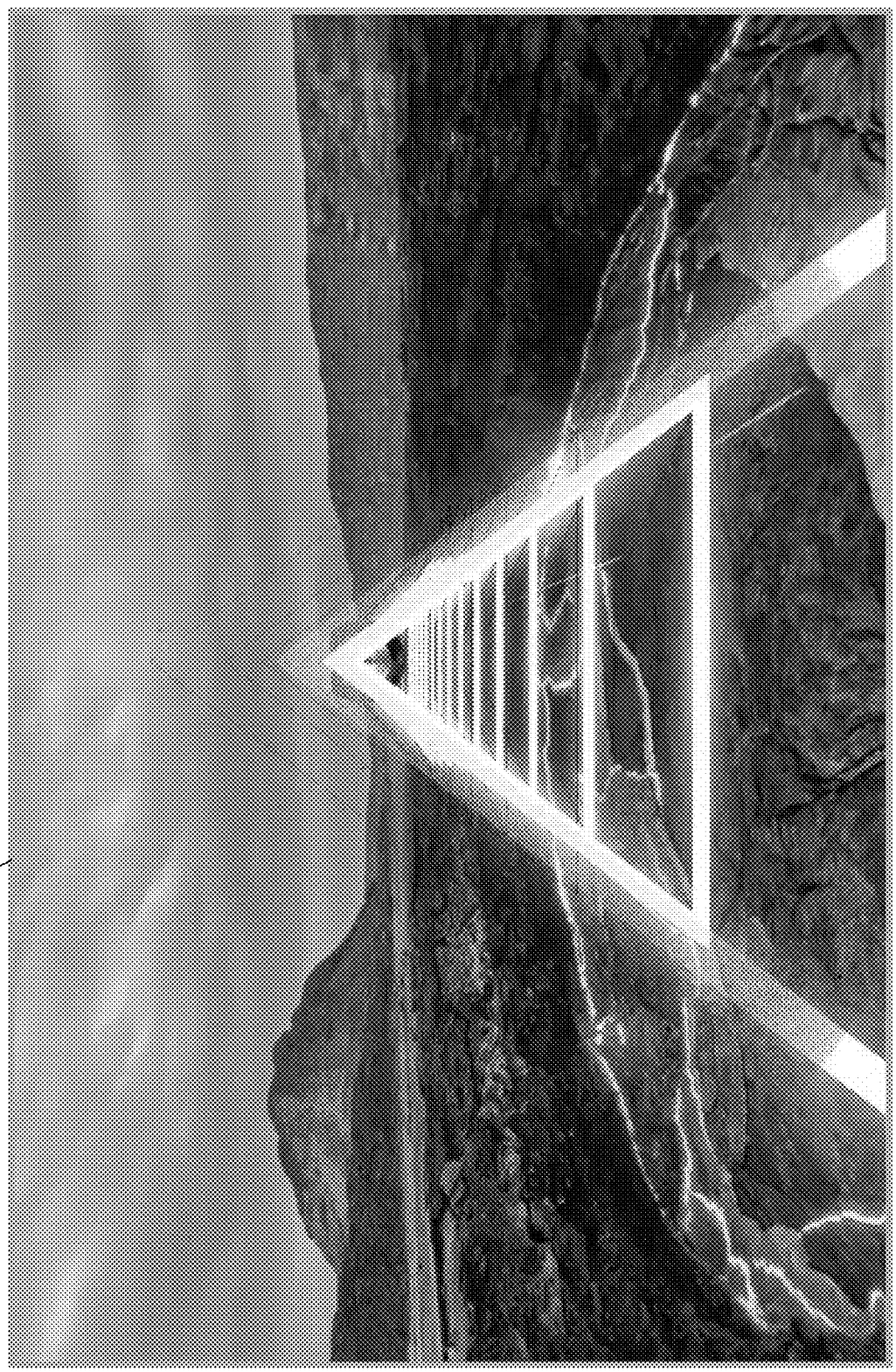

In the example in FIG. 6H, the system sends a squat and hold shape 622H towards the user from a portal 602H. In response, the user should try to squat into the shape 622H so that the user appears to pass through the shape 622H in VR space, and the user should hold the squat until the hold portion 604H has passed by. By determining, e.g., the height and position of the user's head, the system can determine how well and how long they squatted, and the system may adjust their squat score(s) 450 accordingly. FIGS. 15A-15B show a user's view (on their display 124) of a squat and hold shape.

Figure 9F:

As should be appreciated, each of the shapes and/or objects discussed in these examples corresponds to an event in a routine. A routine may include multiple events, and a routine may include multiple simultaneous events. For example, a routine may send multiple hit objects to a user at the same time from the same or different sources (see, e.g., FIGS. 9D, 9E, and 9F).

The System in Operation

Operation of the system is described with reference to the flowcharts in FIGS. 7A-7F.

Figure 7B:
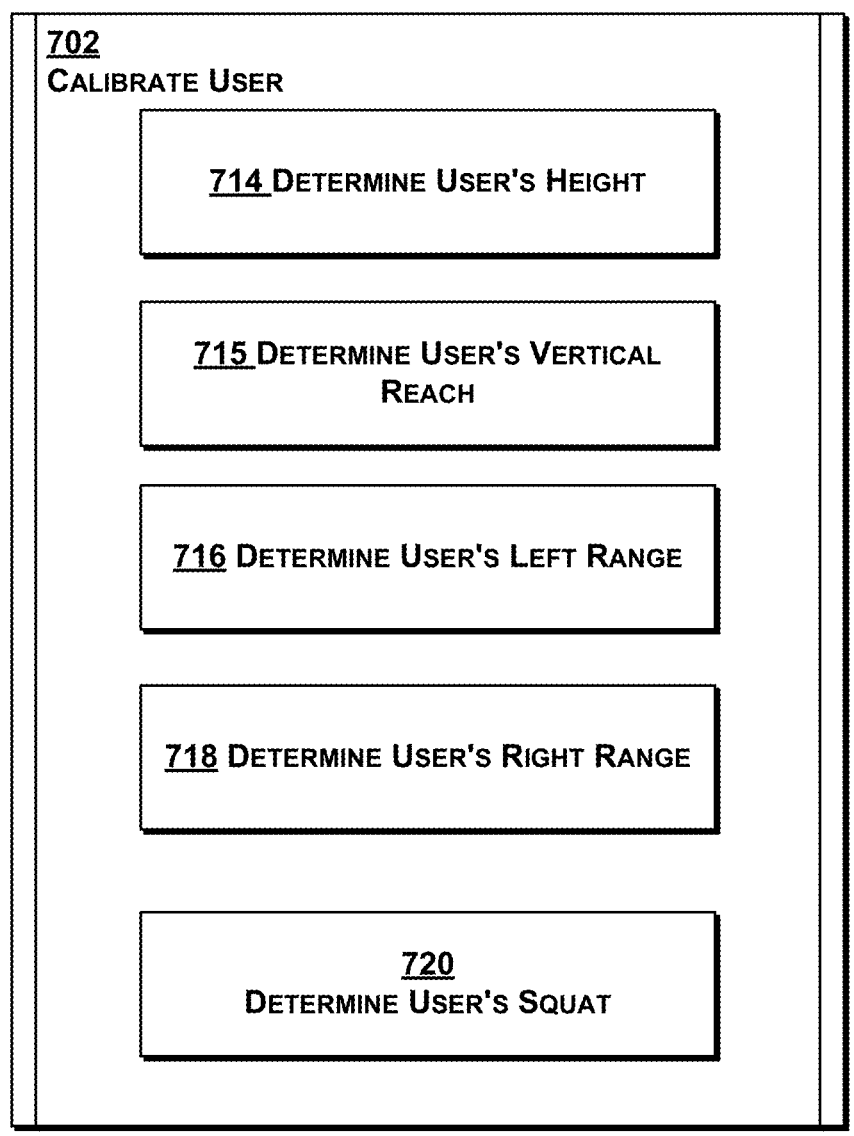

When a user starts, the system will calibrate for that user (at 702 and FIG. 7B, see also FIGS. 8A-8D). Based on that calibration and possibly on other information about the user (e.g., their age, gender, weight, prior system use, etc.), the system may determine an initial routine (at 704).

Figure 7C:
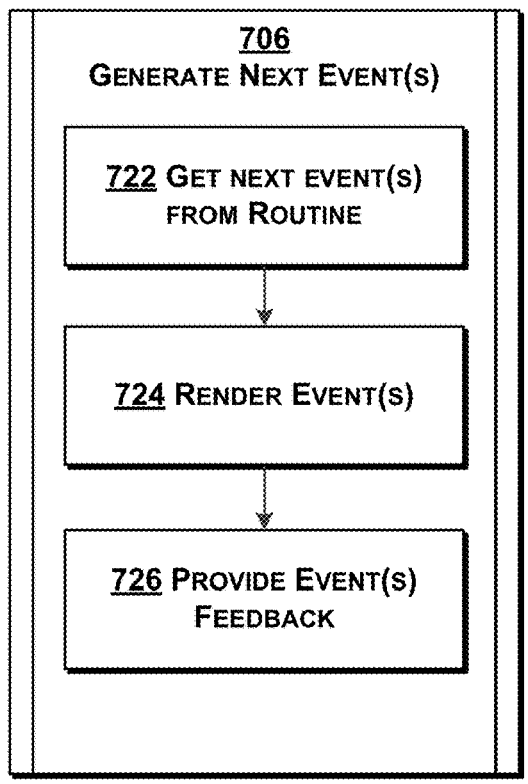

The user then begins their routine, as the system generates the next event(s) in the routine (at 706 and FIG. 7C). The events may include any of the events described above (e.g., hit objects, squats, lunges, etc.). The system analyzes the user's interactions with object(s) (at 708 and FIG. 7D) and determines one or more performance levels for the user (at 710 and FIG. 7E). The system may determine an overall performance level and/or performance levels for the different kinds of events or objects. For example, the user may be very good at hitting objects, but not good at squatting or lunging. The user's performance level may be reflected in and/or derived from their scores 446 (e.g., their previous scores). The user's performance level(s) may include the user's physiological data 456 (e.g., their heart rate).

Depending on the user's performance, the routine may be modified (at 712 and FIG. 7F) to make it easier or harder for the user.

The system continues to generate and present events until the routine is done.

Aspects of user calibration (at 702) are shown in FIG. 7B, in which the system determines the user's height (at 714), vertical reach (at 715) left range (at 716), right range (at 718), and squat range (at 720). The system may use sensors in the headset 104 and the controllers 114-1, 114-2 to determine these values. Examples of a user calibration are shown in FIGS. 8A-8D.

Aspects of the system generating a next event(s) (at 706) are shown in FIG. 7C, in which the system gets the next event(s) from the routine (at 722), renders the events (at 724), and, if necessary, provides feedback to the user. The feedback may be in the form of verbal encouragement and/or training. For example, the feedback may include an avatar or video of a person showing how a routine or event should be (or should have been) performed.

Figure 7D:
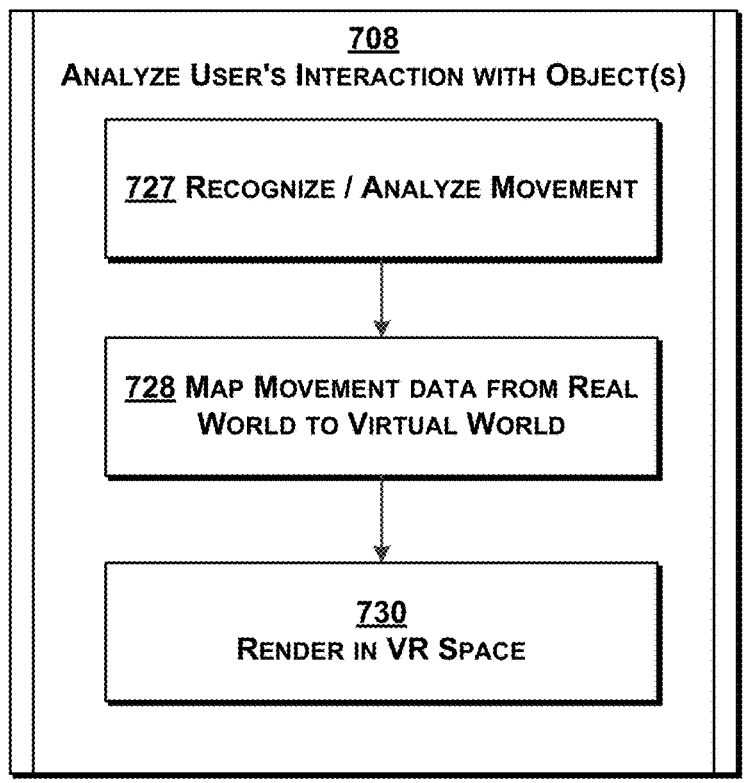

Aspects of the system analyzing the user's interactions with object(s) (at 708) are shown in FIG. 7D, in which the system recognizes and analyzes the user's movements (at 727), maps the user's movements from the real world to the virtual world (at 728), and renders (at 730) the interaction in the VR space (on the user's display 124).

Figure 7E:
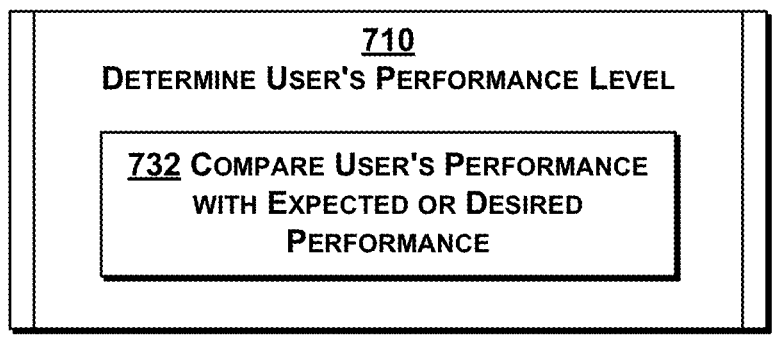

Aspects of the system determining one or more performance levels for the user (at 710) are shown in FIG. 7E, in which the system compares the user's performance with a desired performance (at 732). This comparison may be used to determine the user's scores (446 in FIG. 4B).

Figure 4B:
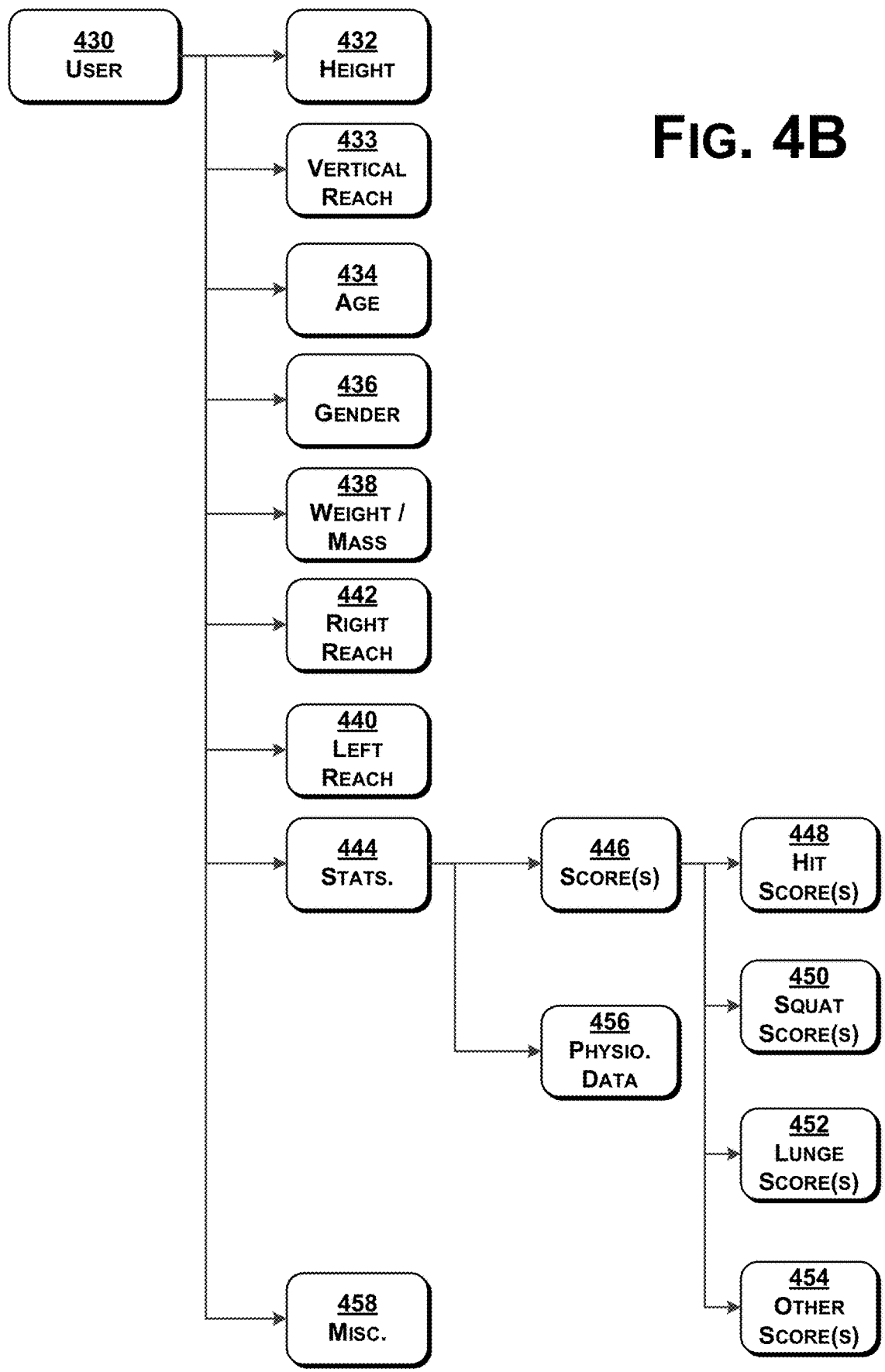
Figure 7F:
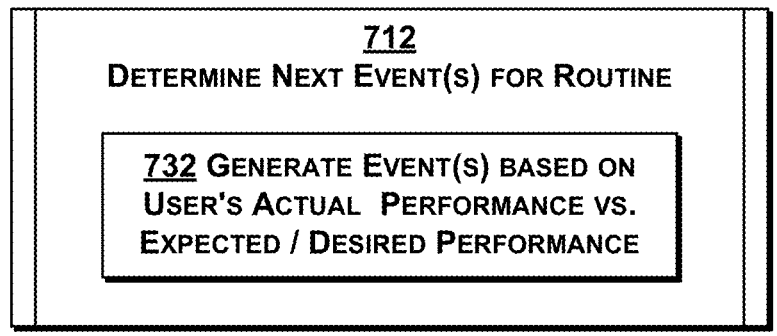
Figure 8A:
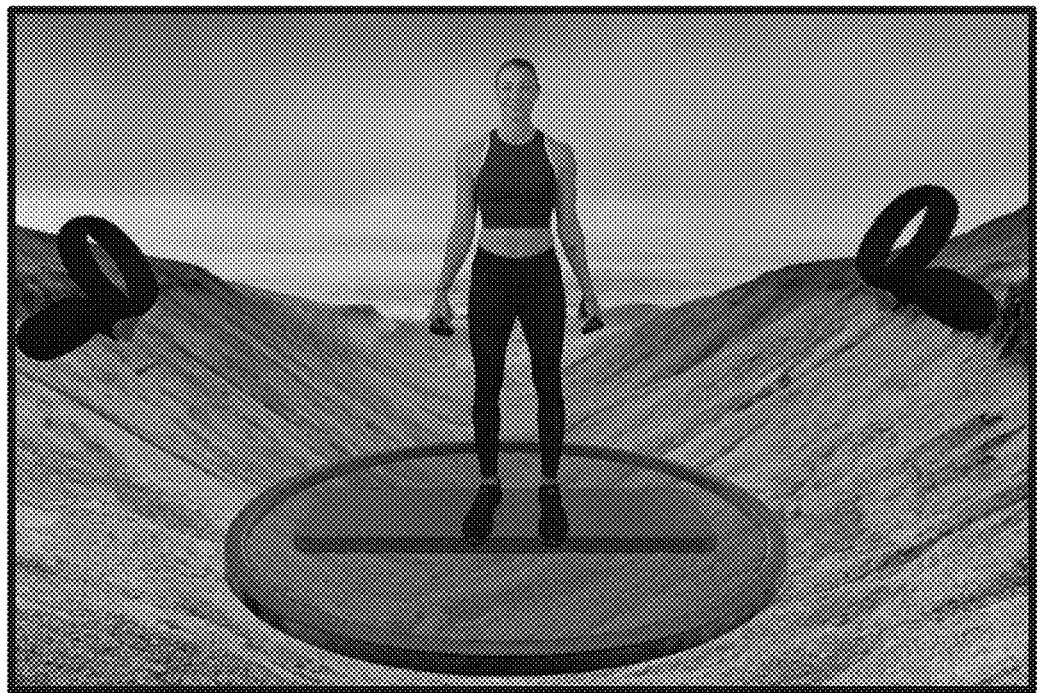
Figure 8B:
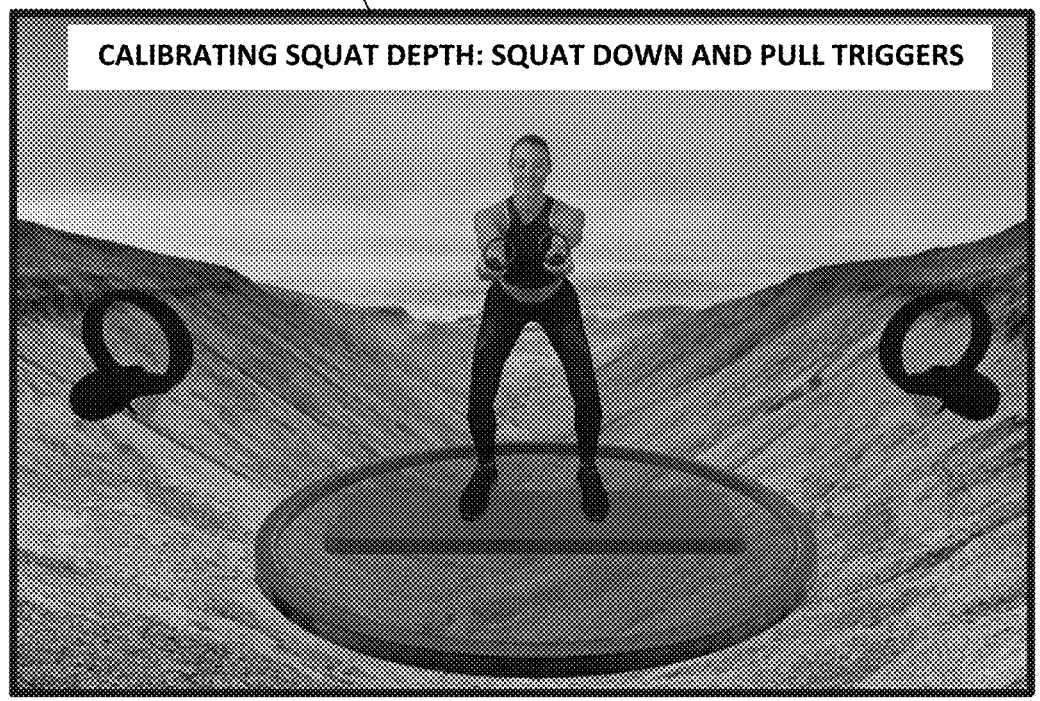
Figure 8C:
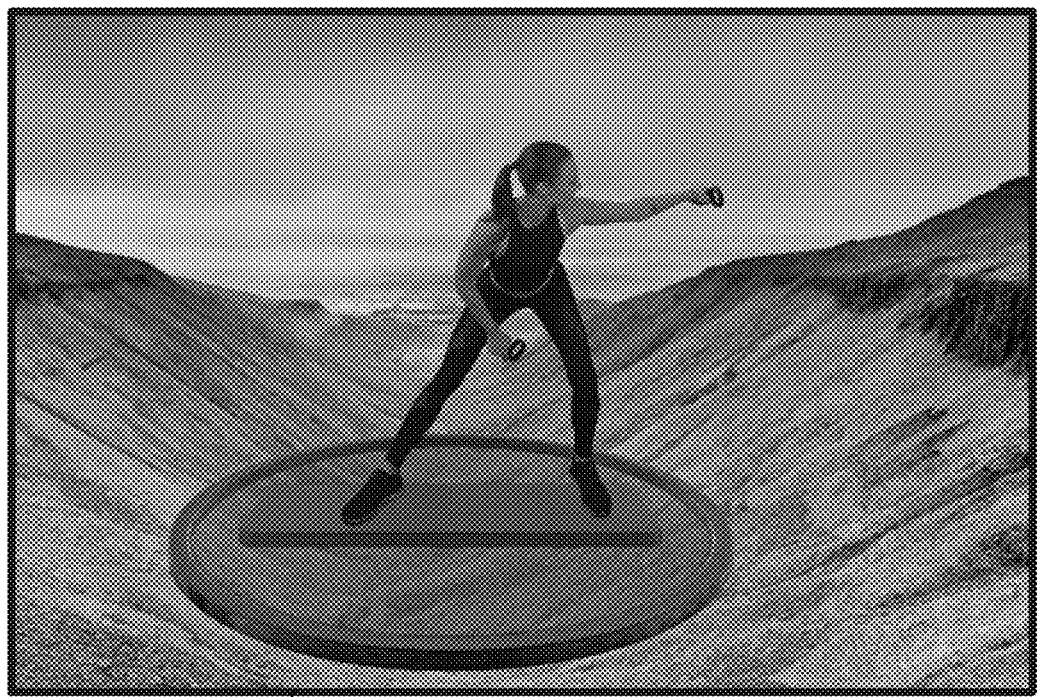
Figure 8D:
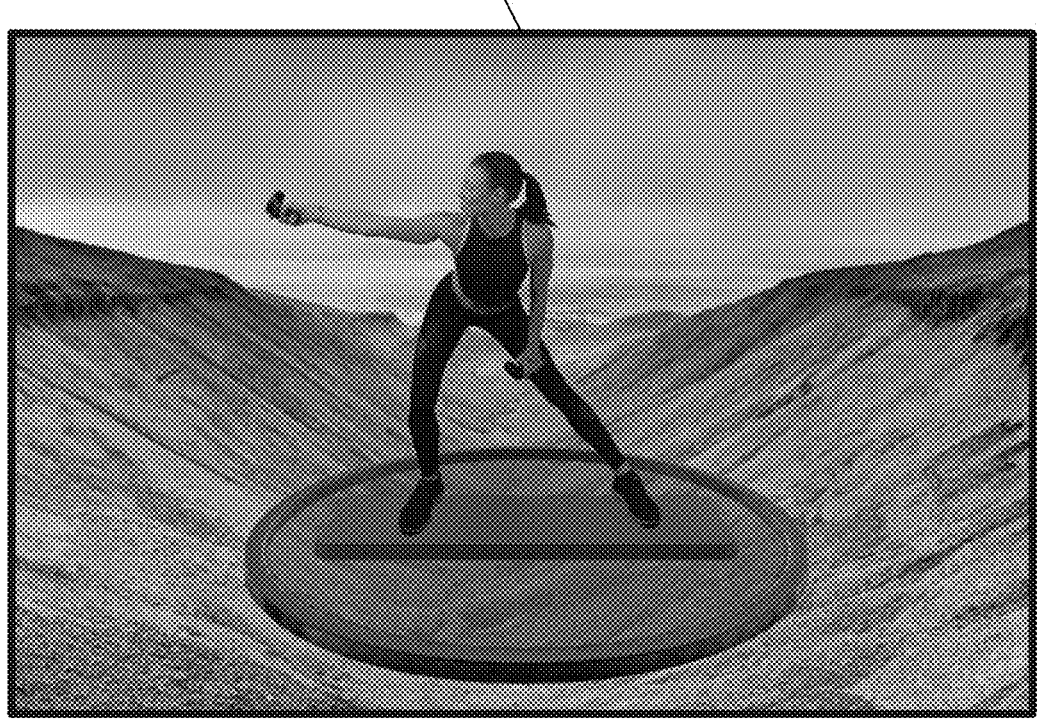

Aspects of the system determines next events for the routine (at 712) are shown in FIG. 7F, in which the system generates one or more next events based on the user's actual performance compared to their desired performance (e.g., as represented by the users scores (446 in FIG. 4B) and/or physiological data (456 in FIG. 4B).

Feedback

As can be seen, the system thus creates and potentially modifies a user's exercise/activity routine based on real-time feedback based on the user's performance.

Recalibration

Although the most of a user's attributes are unlikely to change over time, their squat and lunge ranges may change over time. For this reason, the system should re-calibrate to a user each time it is used.

Real Time

Those of ordinary skill in the art will realize and understand, upon reading this description, that, as used herein, the term "real time" means near real time or sufficiently real time. It should be appreciated that there are inherent delays in electronic components and in network-based communication (e.g., based on network traffic and distances), and these delays may cause delays in data reaching various components. Inherent delays in the system do not change the real time nature of the data. In some cases, the term "real time data" may refer to data obtained in sufficient time to make the data useful for its intended purpose.

Although the term "real time" may be used here, it should be appreciated that the system is not limited by this term or by how much time is actually taken. In some cases, real-time computation may refer to an online computation, i.e., a computation that produces its answer(s) as data arrive, and generally keeps up with continuously arriving data. The term "online" computation is compared to an "offline" or "batch" computation.

EXAMPLES

Example screen shots of aspects of an implementation of the system are shown in FIGS. 8A-8D, 9A-9F, 10A-10H, 11A-11D, 12A-12C, 13A-13C, 14A-14C, and 15A-15B.

Some of these screen shots show the view that the VR user 102 would see on their display 124 (FIGS. 9A-9F, 14A-14C), however some of the shots show a trainer in the view, and may be used for calibration (FIG. 8A-D) or training or tutorial purposes (FIGS. 10A-10H, 11A-11D, 12A-12C, 13A-13C).

As can be seen in these figures, the VR display 124 may include an arbitrary background, so that the user may perceive themselves to be performing their activities in an arbitrary real or imaginary location.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 16:
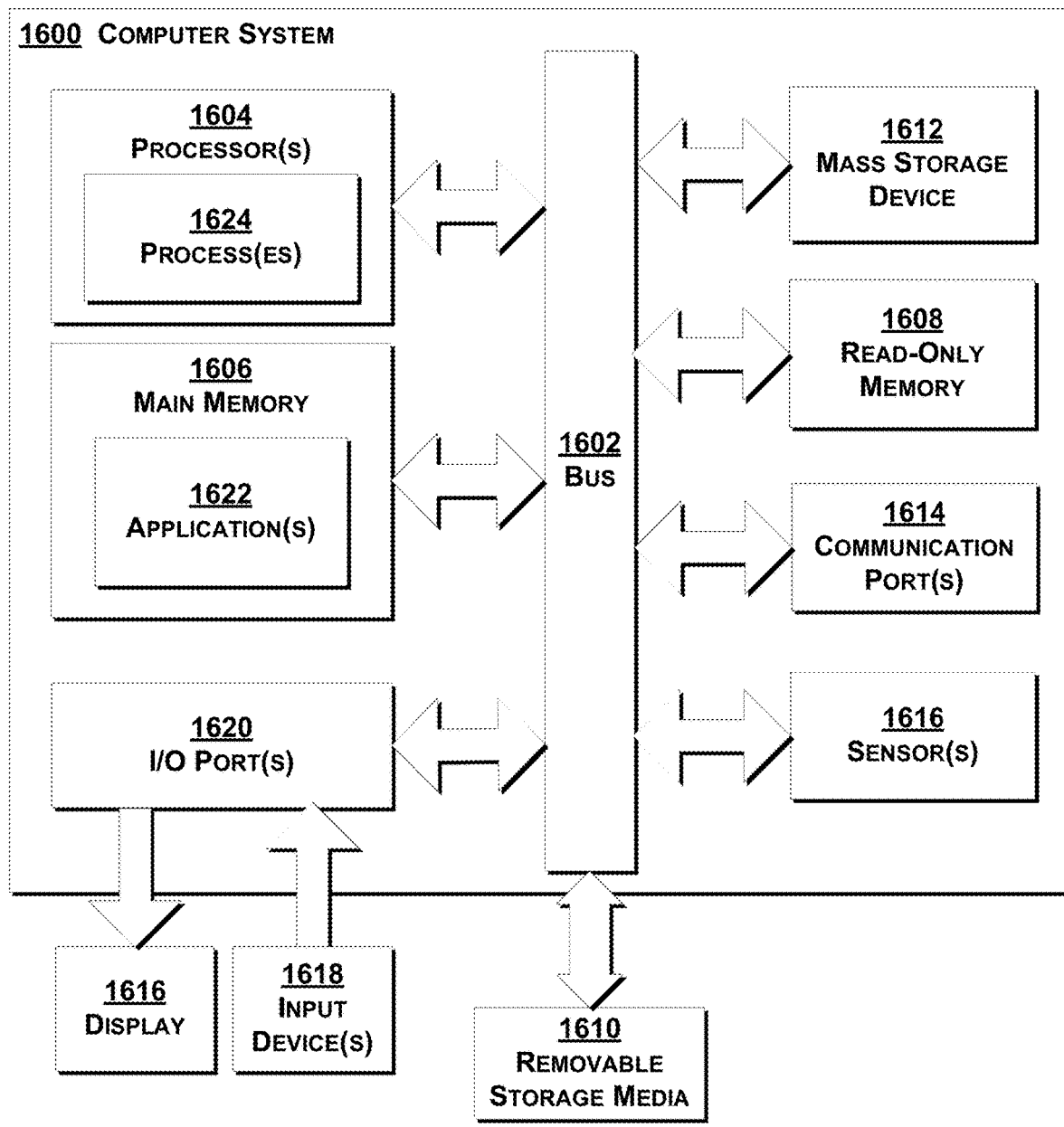
FIG. 16 is a logical block diagram depicting aspects of a computer system.

FIG. 16 is a schematic diagram of a computer system 1600 upon which embodiments of the present disclosure may be implemented and carried out.

According to the present example, the computer system 1600 includes a bus 1602 (i.e., interconnect), one or more processors 1604, a main memory 1606, read-only memory 1608, removable storage media 1610, mass storage 1612, and one or more communications ports 1614. Communication port(s) 1614 may be connected to one or more networks (not shown) by way of which the computer system 1600 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1604 can be any known processor, such as, but not limited to, an Intel® Itanium® or Itanium 2® processor(s), AMD® Opteron® or Athlon MP® processor(s), or Motorola® lines of processors, and the like. Communications port(s) 1614 can be any of an Ethernet port, a Gigabit port using copper or fiber, or a USB port, and the like. Communications port(s) 1614 may be chosen depending on a network such as a Local Area Network (LAN), a Wide Area Network (WAN), or any network to which the computer system 1600 connects. The computer system 1600 may be in communication with peripheral devices (e.g., display screen 1616, input device(s) 1618) via Input/Output (I/O) port 1620.

Main memory 1606 can be Random Access Memory (RAM), or any other dynamic storage device(s) commonly known in the art. Read-only memory (ROM) 1608 can be any static storage device(s) such as Programmable Read- Only Memory (PROM) chips for storing static information such as instructions for processor(s) 1604. Mass storage 1612 can be used to store information and instructions. For example, hard disk drives, an optical disc, an array of disks such as Redundant Array of Independent Disks (RAID), or any other mass storage devices may be used.

Bus 1602 communicatively couples processor(s) 1604 with the other memory, storage, and communications blocks. Bus 1602 can be a PCI/PCI-X, SCSI, a Universal Serial Bus (USB) based system bus (or other) depending on the storage devices used, and the like. Removable storage media 1610 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 1606 is encoded with application(s) 1622 that support(s) the functionality as discussed herein (the application(s) 1622 may be an application(s) that provides some or all of the functionality of the services/mechanisms described herein, e.g., VR sharing application 230, FIG. 2). Application(s) 1622 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1604 accesses main memory 1606 via the use of bus 1602 in order to launch, run, execute, interpret, or otherwise perform the logic instructions of the application(s) 1622. Execution of application(s) 1622 produces processing functionality of the service related to the application(s). In other words, the process(es) 1624 represent one or more portions of the application(s) 1622 performing within or upon the processor(s) 1604 in the computer system 1600.

For example, process(es) 1624 may include an AR application process corresponding to VR sharing application 230.

It should be noted that, in addition to the process(es) 1624 that carries(carry) out operations as discussed herein, other embodiments herein include the application(s) 1622 itself (i.e., the un-executed or non-performing logic instructions and/or data). The application(s) 1622 may be stored on a computer readable medium (e.g., a repository) such as a disk or in an optical medium. According to other embodiments, the application(s) 1622 can also be stored in a memory type system such as in firmware, read only memory (ROM), or, as in this example, as executable code within the main memory 1606 (e.g., within Random Access Memory or RAM). For example, application(s) 1622 may also be stored in removable storage media 1610, read-only memory 1608, and/or mass storage device 1612.

Those skilled in the art will understand that the computer system 1600 can include other processes and/or software and hardware components, such as an operating system that controls allocation and use of hardware resources.

As discussed herein, embodiments of the present invention include various steps or acts or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Although embodiments hereof are described using an integrated device (e.g., a smartphone), those of ordinary skill in the art will appreciate and understand, upon reading this description, that the approaches described herein may be used on any computing device that includes a display and at least one camera that can capture a real-time video image of a user. For example, the system may be integrated into a heads-up display of a car or the like. In such cases, the rear camera may be omitted.

Conclusion

As used herein, including in the claims, the phrase "at least some" means "one or more," and includes the case of only one. Thus, e.g., the phrase "at least some ABCs" means "one or more ABCs," and includes the case of only one ABC.

The term "at least one" should be understood as meaning "one or more," and therefore includes both embodiments that include one or multiple components. Furthermore, dependent claims that refer to independent claims that describe features with "at least one" have the same meaning, both when the feature is referred to as "the" and "the at least one."

As used in this description, the term "portion" means some or all. So, for example, "A portion of X" may include some of "X" or all of "X." In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

As used herein, including in the claims, the phrase "corresponds to" means "corresponds in part to" or "corresponds, at least in part, to," and is not exclusive. Thus, e.g., the phrase "corresponds to factor X" means "corresponds in part to factor X" or "corresponds, at least in part, to factor X." Unless specifically stated by use of the word "only," the phrase "corresponds to X" does not mean "corresponds only to X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)," "(b)," and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including", "having", and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

Reference numerals have just been referred to for reasons of quicker understanding and are not intended to limit the scope of the present invention in any manner.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method comprising:
   (A) providing a user device in a real-world environment, wherein the user device comprises a virtual reality (VR) headset being worn by a person, the VR headset being capable of providing images of scenes and objects to the person through the VR headset to generate a visual representation of a virtual world;
   (B) determining a visual routine for the person to view in the virtual world using the VR headset, said visual routine comprising a plurality of triangles, each of said triangles having a defined shape and an apex;
   (C) determining, during the visual routine, a position of the VR headset in the virtual world;
   (D) based on the determining in (C), presenting to the person in the virtual world a first triangle of said plurality of triangles;
   (E) allowing the person to virtually interact with the presented first triangle in the virtual world;
   (F) comparing the position of the VR headset with respect to a location of the apex of the first triangle; and
   (G) recording results of the comparing in (F).

2. The method of claim 1, wherein said allowing in (E) comprises: allowing the person to virtually interact with the presented first triangle in the virtual world by positioning their body in the real world until the VR headset is positioned below and adjacent to a location of the apex of the presented first triangle.

3. A computer-implemented method comprising:
(A) providing a user device in a real-world environment, wherein the user device comprises a virtual reality (VR) headset being worn by a person, the VR headset being capable of providing images of scenes and objects to the person through the VR headset to generate a visual representation of a virtual world;
(B) determining a visual routine for the person to view in the virtual world using the VR headset, the visual routine comprising a series of objects, said objects being generated from one of a first portal and a second portal, each of said objects advancing towards the person in the virtual world;
(C) presenting, to the person in the virtual world, a first object from the first portal;
(D) providing indication on the first object, a location of the second portal; and
(E) presenting, to the person in the virtual world, a second object from the second portal.

4. The computer-implemented method of claim 3 further comprising: repeating acts (C)-(E) for multiple objects of said visual routine.

5. The computer-implemented method of claim 3, wherein, in (D), the indication on the first object comprises an arrow shape.

6. The computer-implemented method of claim 3, wherein, in (D), the indication on the first object comprises a triangle shape.

* * * * *